United States Patent
Ju et al.

(10) Patent No.: US 8,286,098 B2
(45) Date of Patent: Oct. 9, 2012

(54) MOBILE TERMINAL FOR DISPLAYING EXECUTABLE FUNCTIONS ON A TOUCH SCREEN DISPLAY AND DISPLAY METHOD THEREOF

(75) Inventors: Seokhoon Ju, Seoul (KR); Soohyun Han, Seoul (KR); Jea-Un Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 12/493,117

(22) Filed: Jun. 26, 2009

(65) Prior Publication Data

US 2010/0093400 A1    Apr. 15, 2010

(30) Foreign Application Priority Data

Oct. 10, 2008   (KR) .................. 10-2008-0099491

(51) Int. Cl.
 G06F 3/48   (2006.01)
 G06T 15/00  (2006.01)

(52) U.S. Cl. ........ 715/849; 715/764; 715/837; 715/860; 455/566; 455/414.1

(58) Field of Classification Search .......... 455/566; 715/702, 849, 852, 836, 850, 848
See application file for complete search history.

(56) References Cited

U.S. PATENT DOCUMENTS

| | | | | |
|---|---|---|---|---|
| 6,331,852 B1* | 12/2001 | Gould et al. | ................... | 345/419 |
| 7,134,095 B1* | 11/2006 | Smith et al. | ................... | 715/860 |
| 7,216,305 B1* | 5/2007 | Jaeger | ........................... | 715/849 |
| 2003/0112279 A1* | 6/2003 | Irimajiri | ....................... | 345/810 |
| 2006/0020898 A1* | 1/2006 | Kim et al. | ...................... | 715/764 |
| 2007/0124699 A1* | 5/2007 | Michaels | ....................... | 715/837 |
| 2007/0157089 A1* | 7/2007 | Van Os et al. | ................ | 715/702 |
| 2010/0031202 A1* | 2/2010 | Morris et al. | ................. | 715/863 |

* cited by examiner

*Primary Examiner* — Marcos Batista
*Assistant Examiner* — Keith Fang
(74) *Attorney, Agent, or Firm* — Lee, Hong, Degerman, Kang & Waimey

(57) ABSTRACT

A mobile terminal and a method for displaying executable functions are disclosed. A plurality of rotatable three-dimensional polyhedral icons is displayed on a touch screen display. Executable functions are assigned to the faces of the three-dimensional polyhedral icons, and at least two faces are visible. A polyhedral icon may be selected and continuously rotated about its horizontal and vertical axes to display other faces, and the executable function on the face parallel to the plane of the display may be executed, thereby providing a convenient way to access executable functions of a mobile terminal.

25 Claims, 37 Drawing Sheets

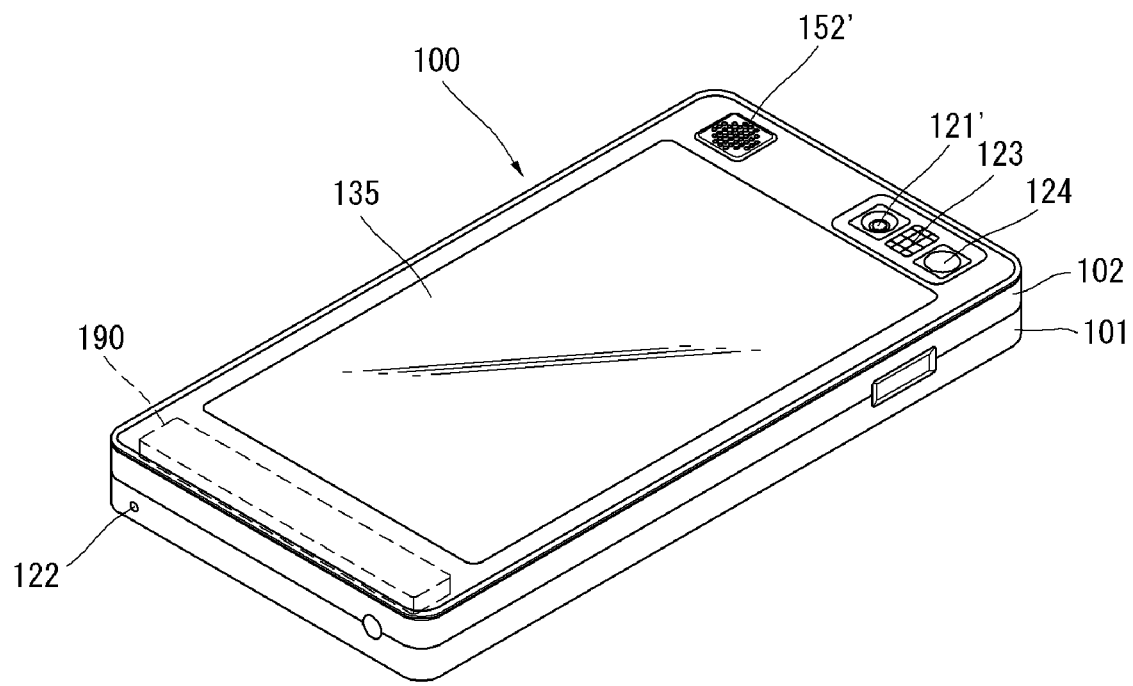

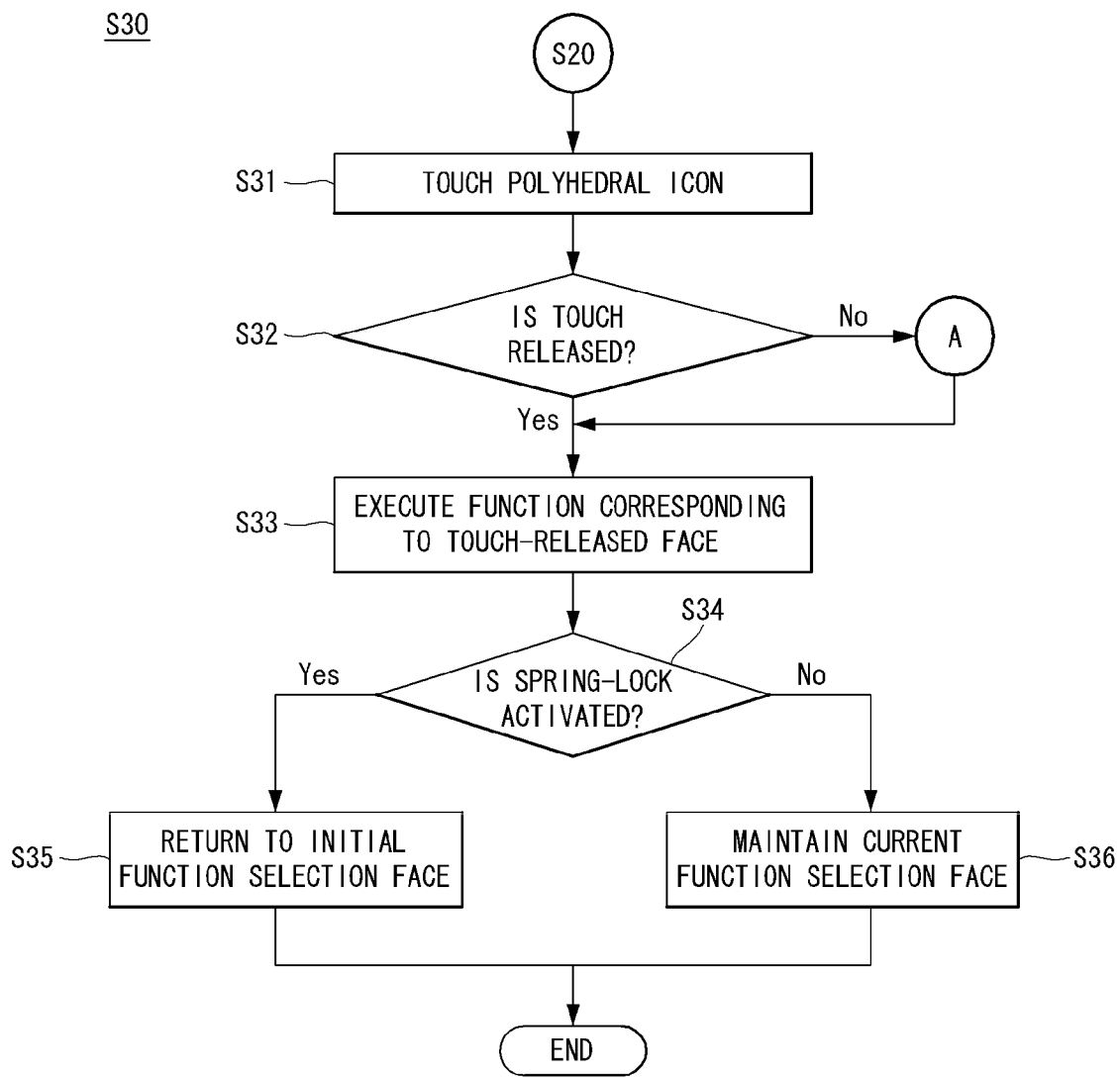

151

100

MOBILE TERMINAL FOR DISPLAYING EXECUTABLE FUNCTIONS ON A TOUCH SCREEN DISPLAY AND DISPLAY METHOD THEREOF

CROSS REFERENCE TO RELATED APPLICATIONS

Pursuant to 35 U.S.C. §119(a), this application claims the benefit of earlier filing date and right of priority to Korean Application No. 10-2008-0099491 filed on Oct. 10, 2008, the contents of which are hereby incorporated by reference in their entirety.

FIELD OF THE APPLICATION

The present invention relates to a mobile terminal and a method for displaying information allowing a specific function to be easily selected through a rotatable polyhedral icon indicating related functions.

DISCUSSION OF THE RELATED ART

As the functions of terminals such as personal computers, laptop computers, and cellular phones are diversified, the terminals are constructed in the form of a multimedia player having multiple functions for capturing images or videos, playing music, moving image files, playing games, and receiving broadcast programs.

Terminals may be divided into mobile terminals and stationary terminals. The mobile terminals may be classified into handheld terminals and vehicle mounted terminals according to whether the terminals are personally carried. A variety of recent terminals, including mobile terminals, provide more complex and various functions.

SUMMARY OF THE INVENTION

The exemplary embodiments of the present application have been made in view of providing a mobile terminal and a method of easily identifying executable functions on a mobile terminal display by assigning executable functions to a rotatable polyhedral icon.

In accordance with an embodiment of the present disclosure, a method for displaying executable functions on a touch screen display includes displaying at least one three dimensional image of a polyhedral icon on the display, assigning an executable function to at least one of the faces of the polyhedral icon, selecting one of the at least one polyhedral icons, rotating the selected polyhedral icon about a horizontal axis or a vertical axis to select and display one of the faces of the selected polyhedral icons, and executing the executable function assigned to the selected face.

In accordance with another embodiment of the present invention, a mobile terminal comprises a touch screen display, and a controller displaying a plurality of rotatable polyhedral icons each having at least two faces indicating executable functions, one face of each of the displayed polyhedral icons is parallel to the touch screen display, wherein touching the parallel face of one of the displayed polyhedral icons executes the executable function associated with parallel face.

Further scope of applicability of the present invention will become apparent from the detailed description and the drawings. However, it should be understood that the detailed description and specific examples, while indicating embodiments of the invention, are given by illustration only, since various changes and modifications within the spirit and scope of the invention will become apparent to those skilled in the art from this detailed description.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

FIG. 2B is a rear perspective view of the mobile terminal according to an embodiment of the present invention.

FIGS. 7 and 8 are flow charts for the display method of the mobile terminal according to the embodiment of the present invention illustrated in FIGS. 6A, 6B and 6C.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to the present invention is described in detail with reference to the drawings. In the following description, suffixes "module" and "unit" of constituent elements are provided for easily describing a specification, instead of having a distinctive meaning or function.

The mobile terminal described in the specification may include a cellular phone, a smart phone, a laptop computer, a digital broadcast terminal, personal digital assistant (PDA), a portable multimedia player (PMP), a navigation system, and so on.

Figure 1:
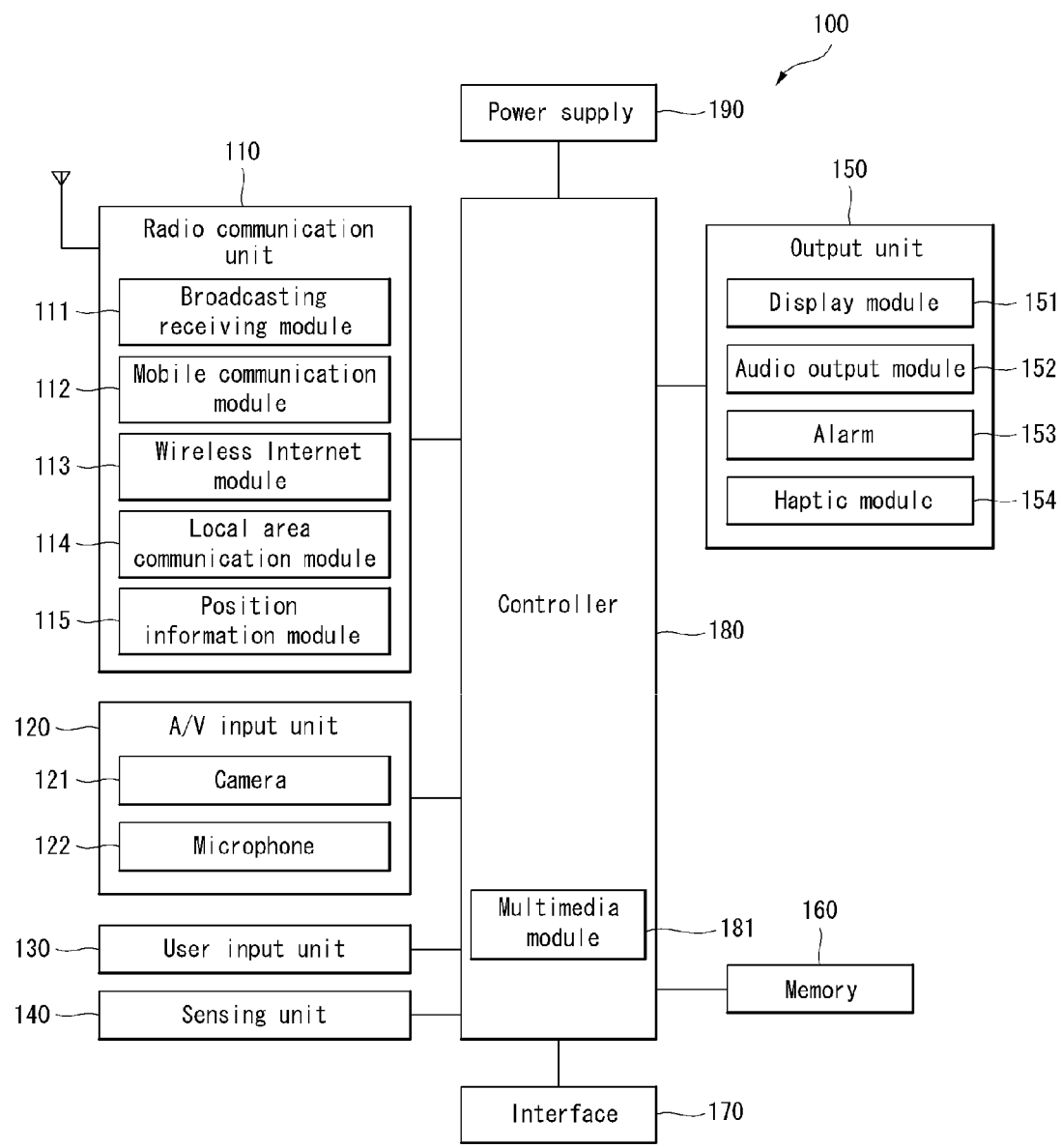
FIG. 1 is a block diagram of a mobile terminal according to an embodiment of the present invention.

FIG. 1 is a block diagram of a mobile terminal 100 according to an embodiment of the present invention. The mobile terminal 100 may include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal may be varied.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcast receiving module 111, a mobile communication module 112, a wireless Internet module 113, a local area communication module 114 and a position information module 115.

The broadcast receiving module 111 receives broadcast signals and broadcast related information from an external broadcast management server through a broadcast channel.

The broadcast channel may include a satellite channel and a terrestrial channel. The broadcast management server may be a server that generates and transmits broadcast signals and/or broadcast related information or a server that receives previously created broadcast signals and broadcast related information and transmits the broadcast signals and/or broadcast related information to a terminal. The broadcast signals may include not only TV broadcast signals, radio broadcast signals and data broadcast signals but also signals in the form of combination of a TV broadcast signal and a radio broadcast signal.

The broadcast related information may be information on a broadcast channel, a broadcast program or a broadcast service provider. The broadcast related information may be provided even through a mobile communication network. In this case, the broadcast related information may be received by the mobile communication module 112.

The broadcast related information may exist in various forms. For example, the broadcast related information may exist in the form of electronic program guide (EPG) of digital multimedia broadcast (DMB) or in the form of electronic service guide (ESG) of digital video broadcast-handheld (DVB-H).

The broadcast receiving module 111 receives broadcast signals using various broadcast systems. Particularly, the broadcast receiving module 111 may receive digital broadcast signals using digital broadcast systems such as digital multimedia broadcast-terrestrial (DMB-T), digital multimedia broadcast-satellite (DMB-S), media forward link only (MediaFLO), DVB-H and integrated services digital broadcast-terrestrial (ISDB-T) systems. The broadcast receiving module 111 may be constructed suited to broadcast systems providing broadcast signals other than the above-described digital broadcast systems.

The broadcast signals and broadcast related information received through the broadcast receiving module 111 may be stored in the memory 160.

The mobile communication module 112 transmits/receives a radio signal to/from at least one of a base station, an external terminal, and a server on a mobile communication network. The radio signal may include a voice call signal, a video telephony call signal or data in various forms according to transmission and receiving of text/multimedia messages.

The wireless Internet module 113 means a module for wireless Internet access and may be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on may be used as a wireless Internet technique.

The local area communication module 114 means a module for local area communication. Bluetooth™, radio frequency identification (RFID), infrared data association (IrDA), ultra wideband (UWB), and ZigBee™ may be used as a local area communication technique.

The position information module 115 confirms or obtains the position of the mobile terminal. A global positioning system (GPS) module is a representative example of the position information module 115. According to the current technology, the GPS module 115 may calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

The A/V input unit 120 is used to input an audio signal or a video signal and includes a camera 121 and a microphone 122. The camera 121 processes a frame of a still image or of a moving images obtained by an image sensor in a video telephony mode or a photographing mode. The processed image frames may be displayed on a display unit 151.

The image frames processed by the camera 121 may be stored in the memory 160 or transmitted to an external device through the radio communication unit 110. The mobile terminal 100 may include at least two cameras according to constitution of the terminal.

The microphone 122 receives an external audio signal in a call mode, a recording mode, or a speed recognition mode and processes the received audio signal into electric audio data. The audio data may be converted into a form that may be transmitted to a mobile communication base station through the mobile communication module 112 and output in the call mode. The microphone 122 may employ various noise removal algorithms for removing noise generated when the external audio signal is received.

The user input unit 130 receives input data for controlling the operation of the terminal. The user input unit 130 may include a keypad, a dome switch, a touch pad (constant voltage or capacitance), jog wheel, and a jog switch.

The sensing unit 140 senses the current state of the mobile terminal 100, such as an open or a closed state of the mobile terminal 100, the position of the mobile terminal 100, whether a user touches the mobile terminal 100, the direction of the mobile terminal 100 and acceleration or deceleration of the mobile terminal 100 and generates a sensing signal for controlling the operation of the mobile terminal 100. For example, when the mobile terminal 100 is the slide phone, the sensing unit 140 may sense whether a slide phone is opened or closed. Further, the sensing unit 140 may sense whether the power supply 190 supplies power, and whether the interface 170 is connected to an external device. The sensing unit 140 may include a proximity sensor.

The output unit 150 generates visual, auditory, or tactile output; and may include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or received image, UI, or GUI when the mobile terminal 100 is in the video telephony mode or the photographing mode.

The display unit 151 may include at least one of a liquid crystal display, a thin film transistor liquid crystal display, an organic light-emitting diode display, a flexible display, and a three-dimensional display.

According to an implementation of the mobile terminal 100, two or more display modules 151 may exist. For example, in the mobile terminal 100, a plurality of display units may be disposed apart at one surface, be integrally disposed, or be each disposed at different surfaces.

When the display module 151 and a sensor ('touch sensor') for detecting a touch operation are formed in an interlayer structure ('touch screen'), the display module 151 may be used as an input device as well as an output device. The touch sensor may be a touch film, a touch sheet, or a touch pad.

When the display unit 151 and a touch sensor form a layered structure, a touch screen, the display unit 151 may be used as an input device in addition to an output device. The touch sensor may be in the form of a touch film, a touch sheet and a touch pad, for example.

The touch sensor may convert a variation in pressure applied to a specific portion of the display unit 151 or a variation in capacitance generated at a specific portion of the display unit 151 into an electric input signal. The touch sensor may detect a touched position, a touch area, and a touched pressure.

When touch input is applied to the touch sensor, a signal corresponding to the touch input is transmitted to a touch controller. The touch controller processes the signal and transmits data corresponding to the processed signal to the controller 180. Accordingly, the controller 180 may detect a touched portion of the display 151.

The proximity sensor 141 may be located in an internal region of the mobile terminal, surrounded by the touch screen, or near the touch screen. The proximity sensor senses an object approaching a predetermined sensing face, an object located near the proximity sensor using electromagnetic force, or infrared rays without having mechanical contact. The proximity sensor has lifetime longer than that of a contact sensor and has wide application. The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) may be classified as a proximity sensor.

Approaching the touch screen with the pointer not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern may be displayed on the touch screen.

The audio output module 152 may output audio data received from the radio communication unit 110 or stored in the memory 160 in a call signal receiving mode, a telephone call mode or a recording mode, a speech recognition mode, and a broadcast receiving mode. The audio output module 152 outputs audio signals related to functions (for example, a call signal incoming tone, a message incoming tone, etc.) performed in the mobile terminal 100. The audio output module 152 may include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 may output signals in forms different from video signals or audio signals, for example, a signal for indicating generation of an event through vibration. The video signals or the audio signals may be also output through the display unit 151 or the audio output module 152.

The haptic module 154 generates various haptic effects that the user may feel. A representative example of the haptic effects is vibration. The intensity and pattern of vibration generated by the haptic module 154 may be controlled. For example, different vibrations may be combined and output or sequentially output.

The haptic module 154 may generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibration.

The haptic module 154 may not only transmit haptic effects through direct contact but also allow the user to feel haptic effects through kinesthetic sense of his fingers or arms. The mobile terminal 100 may include at least two haptic modules 154 according to constitution of the mobile terminal.

The memory 160 may store a program for the operation of the controller 180 and temporarily store input and output data (for example, phone book, messages, still images, moving images, etc.). The memory 160 may store data about vibrations and sounds in various patterns, which are output from when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may operate in relation to a web storage performing the storing function of the memory 160 on the Internet.

The interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 may include a wired/wireless headset port, an external charger port, a wired or wireless data port, a memory card port, a port for connecting a device having a user identification module, an audio I/O port, a video I/O port, and an earphone port, for example.

An identification module is a chip that stores information for authenticating the authority to use the mobile terminal 100 and may include a user identify module (UIM), a subscriber identify module (SIM), and a universal subscriber identify module (USIM). A device (referred to as an identification device) including the identification module may be manufactured in the form of a smart card. Accordingly, the identification device may be connected to the mobile terminal 100 through a port.

The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle may be used as a signal for confirming whether the mobile terminal 100 is correctly set in the cradle.

The controller 180 controls the overall operation of the mobile terminal. For example, the controller 180 performs control and processing for voice communication, data communication, and video telephony. The controller 180 may include a multimedia module 181 for playing multimedia. The multimedia module 181 may be included in the controller 180 or separated from the controller 180.

The controller 180 may perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention may be implemented in a computer or similar device readable recording medium using software, hardware, or a combination thereof, for example.

According to hardware implementation, the embodiments of the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for executing functions. In some cases, the embodiments may be implemented by the controller 180.

When embodiments are performed using software, embodiments such as procedures or functions may be implemented with a separate software module executing at least one function or operation. Software codes may be implemented according to a software application written in an appropriate software language. Furthermore, the software codes may be stored in the memory 160 and executed by the controller 180.

Figure 2A:
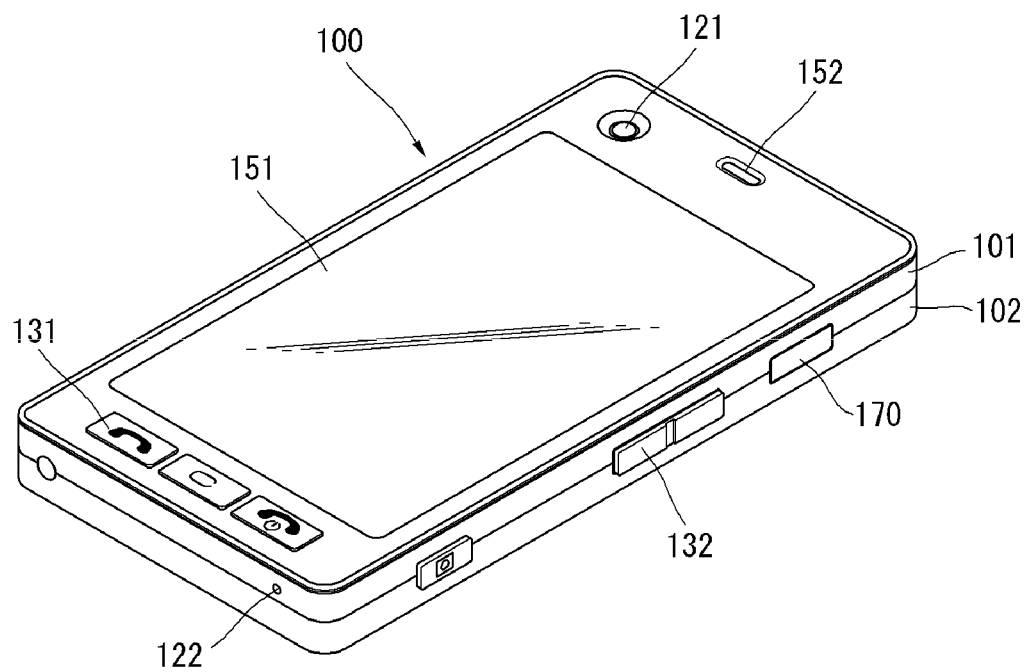
FIG. 2A is a front perspective view of the mobile terminal according to an embodiment of the present invention.

FIG. 2A is a front perspective view of a mobile terminal or a handheld terminal 100 according to an embodiment of the present invention. The handheld terminal 100 has a bar type terminal body. However, the present invention is not limited to a bar type terminal and may be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case may be divided into a front case 101 and a rear case 102. Various electronic components are arranged in the space formed between the front case 101 and the rear case 102. At least one intermediate case may be additionally arranged between the front case 101 and the rear case 102.

The cases may be formed of plastics through injection molding or made of a metal material such as stainless steel (STS) or titanium (Ti).

The display unit 151, the audio output unit 152, the camera 121, the input units 131 and 132, the microphone 122 and the interface 170 may be arranged in the terminal body, specifically, in the front case 101.

The display unit 151 occupies most part of the main face of the front case 101. The audio output unit 152 and the camera 121 are arranged in a region in proximity to one end of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and may include a plurality of input units 131 and 132. The input units 131 and 132 may be referred to as manipulating portions and employ any tactile manner in which a user operates the input units 131 and 132 while having tactile feedback.

The first and second input units 131 and 132 may receive various inputs. For example, the first operating unit 131 receives commands such as start, end, and scroll, and the second operating unit 132 receives commands such as volume control of the audio output unit 152 or conversion of the display unit 151 to a touch recognition mode.

FIG. 2B is a rear perspective view of the handheld terminal shown in FIG. 2A according to an embodiment of the present invention. A camera 121' may be additionally attached to the rear side of the terminal body, that is, the rear case 102. The camera 121' has a photographing direction opposite to that of the camera 121 shown in FIG. 2A and may have a resolution different than that of camera 121.

For example, it is desirable that the camera 121 has low resolution such that it may capture an image of the face of a user and transmit the image to a receiving part in case of video telephony while the camera 121' has high resolution for capturing a general image. The cameras 121 and 121' may be attached to the terminal body such that they may be rotated or be presented in a pop-up mode.

A flash 123 and a mirror 124 may be additionally arranged in proximity to the camera 121'. The flash 123 lights an object when the camera 121' takes a picture of the object. The mirror 124 is used for the user to look at his or her face in the mirror when the user wants to self-photograph himself or herself using the camera 121'.

An audio output unit 152' may be additionally provided on the rear side of the terminal body. The audio output unit 152' may achieve a stereo function with the audio output unit 152 shown in FIG. 2A and be used for a speaker phone mode when the terminal is used for communication.

A broadcast signal antenna 124 may be additionally attached to the side of the terminal body in addition to an antenna for telephone calls. The antenna 124 may be a part of the broadcast receiving module 111 shown in FIG. 1 and may be mounted in the terminal body such that the antenna 124 may be retracted from the terminal body.

The power supply 190 for providing power to the handheld terminal 100 may be mounted in the terminal body. The power supply 190 may be provided within the terminal body or detachably provided to the terminal body.

A touch pad 135 for sensing touch may be additionally attached to the rear case 102. The touch pad 135 may be of a light transmitting type as the display unit 151. If the display unit 151 provided visual information through both sides, the visual information may be recognized through the touch pad 135. The information provided through both sides of the display unit 151 may be controlled by the touch pad 135. Alternatively, a display is additionally mounted in the touch pad 135 such that a touch screen may be disposed on the rear case 102.

The touch pad 135 operates in connection with the display unit 151 of the front case 101. The touch pad 135 may be located in parallel to the rear side of the display unit 151. The touch panel 135 may have a size the same as or smaller than that of the display unit 151.

Figure 3:
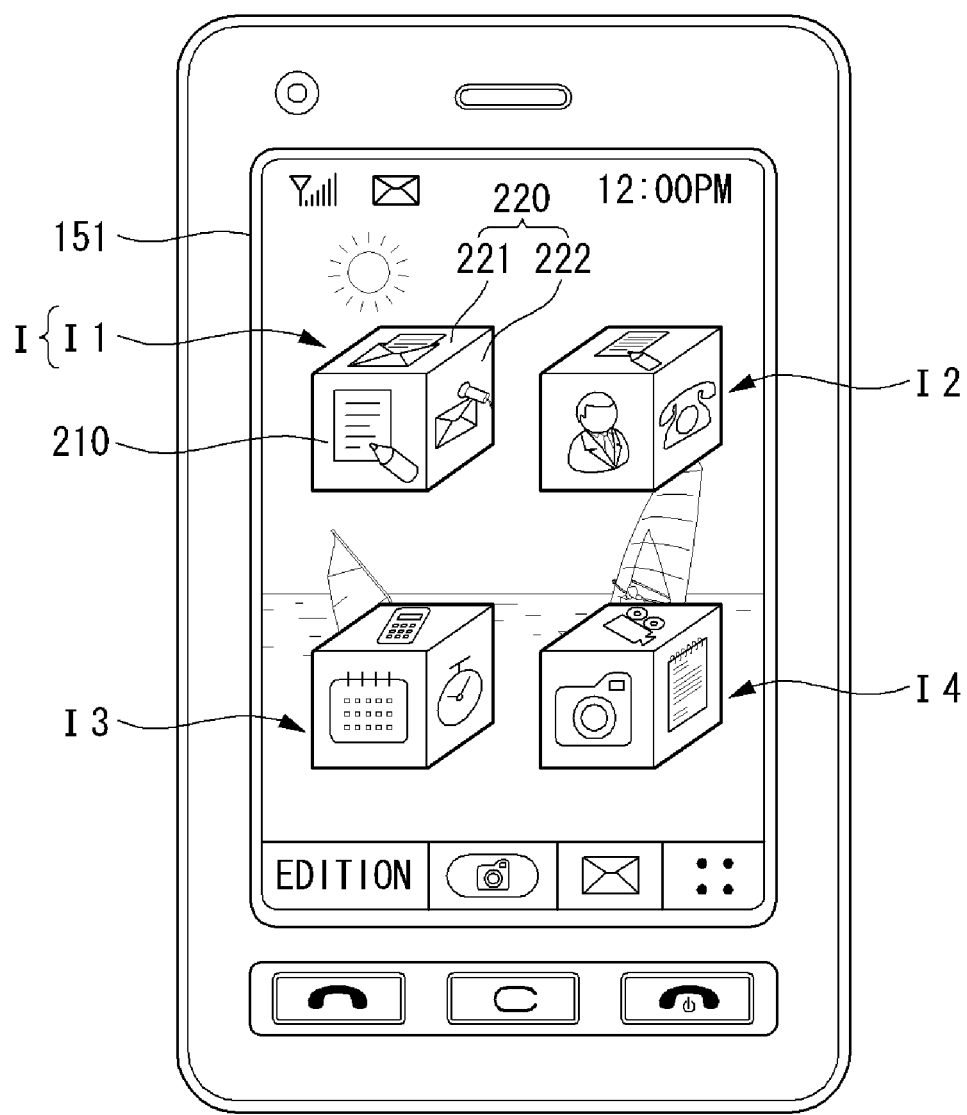
FIG. 3 illustrates a display unit of a mobile terminal according to an embodiment of the present invention.

FIG. 3 illustrates a display unit 151 of a mobile terminal 100 according to an embodiment of the present invention.

Referring to FIG. 3, a plurality of polyhedral icons I are displayed at regular intervals on the display unit 151 according to one embodiment of the present invention. The polyhedral icons I have a three-dimensional shape such that the depths of the polyhedral icons I may be perceived although the polyhedral icons I are displayed on the plane of the display unit 151. The polyhedral icons I may be rotated in horizontal and vertical directions through a touch and drag operation. A desired polyhedral icon may be rotated such that a desired function is indicated on the front side of the polyhedral icon, and the function indicated on the front side of the polyhedral icon may be selected to execute the function.

Each of the polyhedral icons I may indicate related functions. Since the polyhedral icons I are rotatable, as described above, related functions may be allocated to a single polyhedral icon such that the related functions may be easily accessed through a simple rotating operation. For example, a second polyhedral icon I2 displays a picture of a friend who is in frequent contact with a user of the mobile terminal 100 on one side and indicates a phone function on another side. In this case, the user may touch the picture of the friend, displayed on the front side of the polyhedral icon I2, and drag the touch to the left to move the phone function to the front side of the polyhedral icon I2. When the touch is released after the phone function is moved to the front side of the polyhedral icon I2, a call is placed to the friend.

As another example, the picture of the friend may be touched and the touch dragged downward to move a message send function indicated on the top side of the polyhedral icon I2 to the front side of the polyhedral icon I2. When the touch is released after the message send function is moved to the front side I2, a message may be directly sent to the friend. Accordingly, an operation of clicking a menu, searching for a called party or a message receiving party and selecting the called party or message receiving party may be omitted.

As described above, related functions are indicated on a single polyhedral icon I, and thus there is no need to search for a menu. The polyhedral icons I may include first, second, third and fourth polyhedral icons I1, I2, I3 and I4, each having different functions. Polyhedral icon I1 I is explained hereinafter and the polyhedral icon I corresponds to the first polyhedral icon I1 in the following description. The polyhedral icon I includes a function selection face 210 and related function faces 220.

The function selection face 210 corresponds visually to the front side of the polyhedral icon I. Although the function selection face 210 is displayed parallel to the plane of the display unit 151, the function selection face 210 is seen as if protruding from the plane of the display unit 151, and thus the function selection face 210 may be easily recognized. The function displayed on the function selection face 210 may be executed by touching the function face 210. The function selection face 210 refers to the front face of the polyhedral icon I, but does not indicate a specific function because the polyhedral icon I may be rotated in horizontal and vertical directions thereby changing the selected function.

The function selection face 210 of the polyhedral icon I currently indicates a message composing function. However, when a received message confirmation function indicated on the top face of the polyhedral icon I is moved to the front face, the received message confirmation function becomes a new function selection face 210.

The related function faces 220 correspond to other faces of the polyhedral icon I. The related function faces 220 may indicate functions related to the function indicated on the function selection face 210. The polyhedral icon I may be touched and dragged to rotate the polyhedral icon I to move one of the related function faces 220 to the function selection face 210. When the related function face 220 becomes the new function selection face 210, the function indicated on the previous function selection face 210 is moved to another face and the face indicating that function becomes a new related function face 220. The polyhedral icon I according to the current embodiment of the present invention is a cube.

Although any polyhedron may be used, regular convex polyhedrons are preferred. Accordingly, the related function faces 220 may include related function faces (221, 222, 223, 224 and 225 in FIG. 4A) respectively corresponding to right, top, left, bottom, and rear faces of the polyhedral icon I. Although the polyhedral icon I is a cube shown in the current embodiment for convenience of explanation, the polyhedral icon I is not limited thereto.

FIGS. 4A, 4B, 4C and 4D illustrate one of the polyhedral icons I illustrated in FIG. 3. FIG. 4E shows the functions indicated on the polyhedral icon illustrated in FIGS. 4A, 4B, 4C, and 4D as a planar view. The polyhedral icon according to an embodiment of the present invention will now be explained in detail with reference to FIGS. 4A through 4E.

Figure 4A:
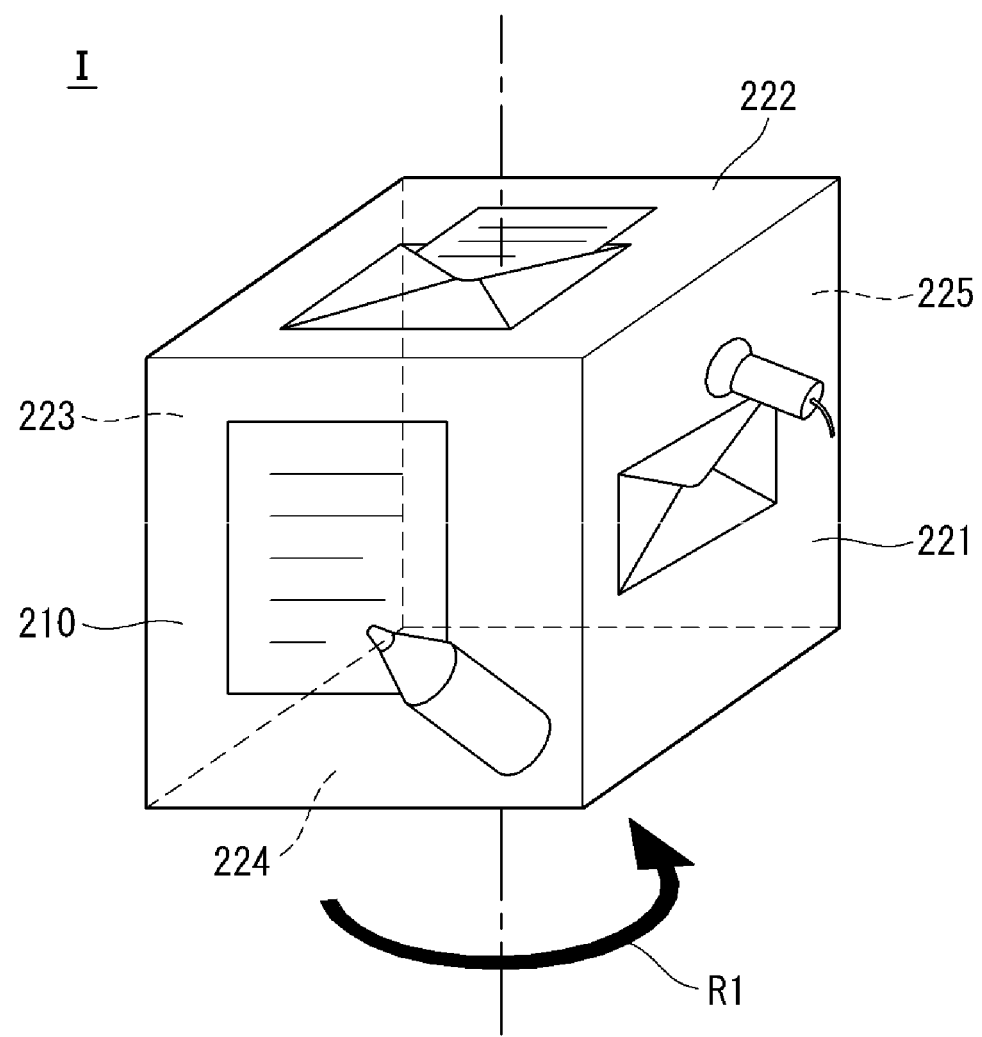
FIGS. 4A, 4B, 4C and 4D illustrate one of the polyhedral icons illustrated in FIG. 3.

As illustrated in FIG. 4A, the message send function may be indicated on the function selection face 210 of the polyhedral icon I. The function selection face 210 may be touched and then the touch released to execute the message send function. When the message send function is executed, a screen for composing a message is displayed. To execute a function other than the message send function, the polyhedral icon I is rotated to search for the desired function. Although the polyhedral icon I may be rotated in vertical and horizontal directions, rotating the polyhedral icon I in a first rotating direction R1 from the left to the right is described in the current embodiment of the present invention.

Figure 4B:
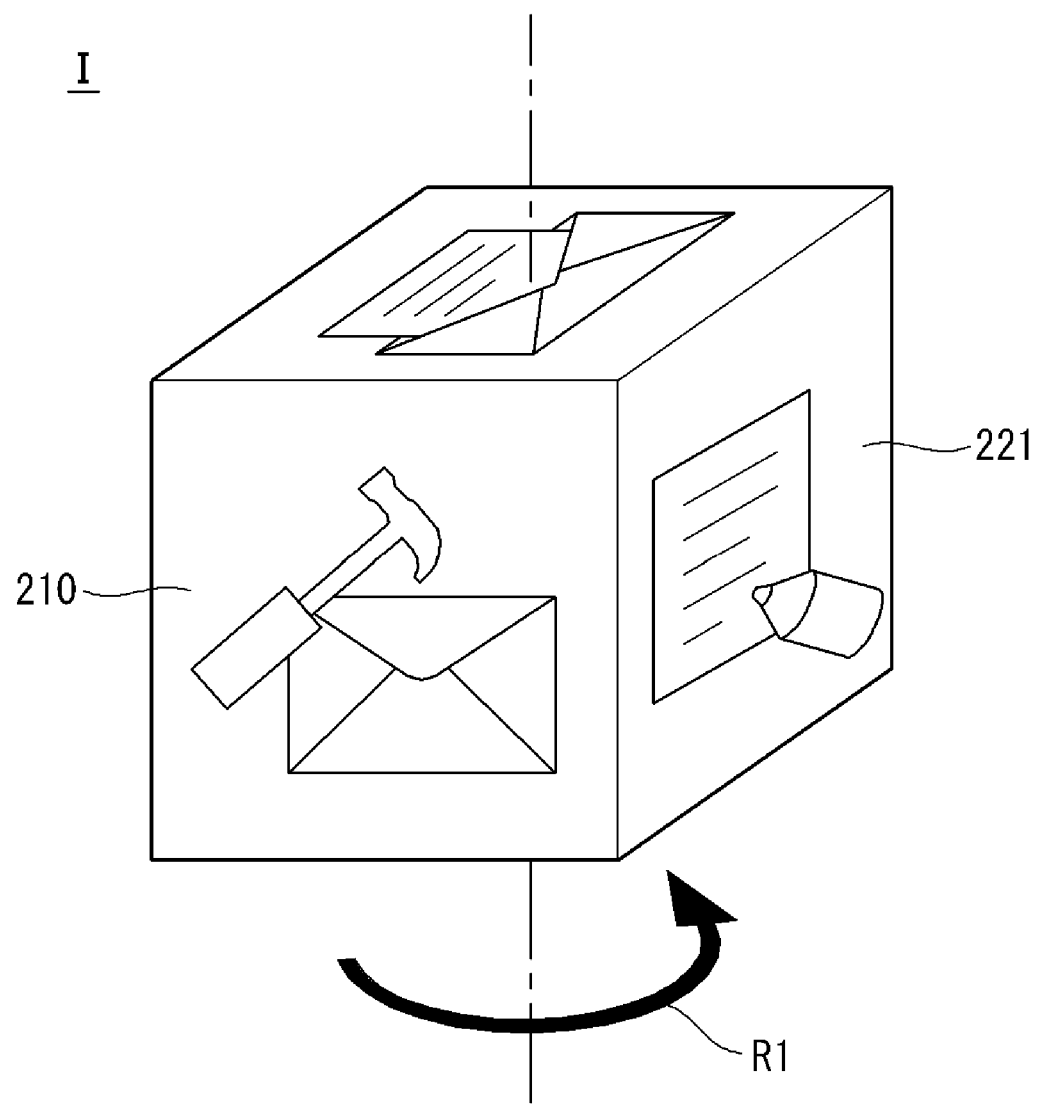

Referring to FIG. 4B, when the polyhedral icon I is rotated in the first rotating direction R1 (as shown in FIG. 4A), a message environment setting function is indicated on the function selection face 210 and the message send function indicated on the previous function selection face 210 is moved to the first related function face 221. While FIGS. 4A, 4B, 4C, and 4D illustrate that the polyhedral icon I has been rotated, the polyhedral icon I may be continuously rotated while changing its shape. The polyhedral icon I may be continuously rotated in the first rotating direction R1 if another function is desired.

Figure 4C:
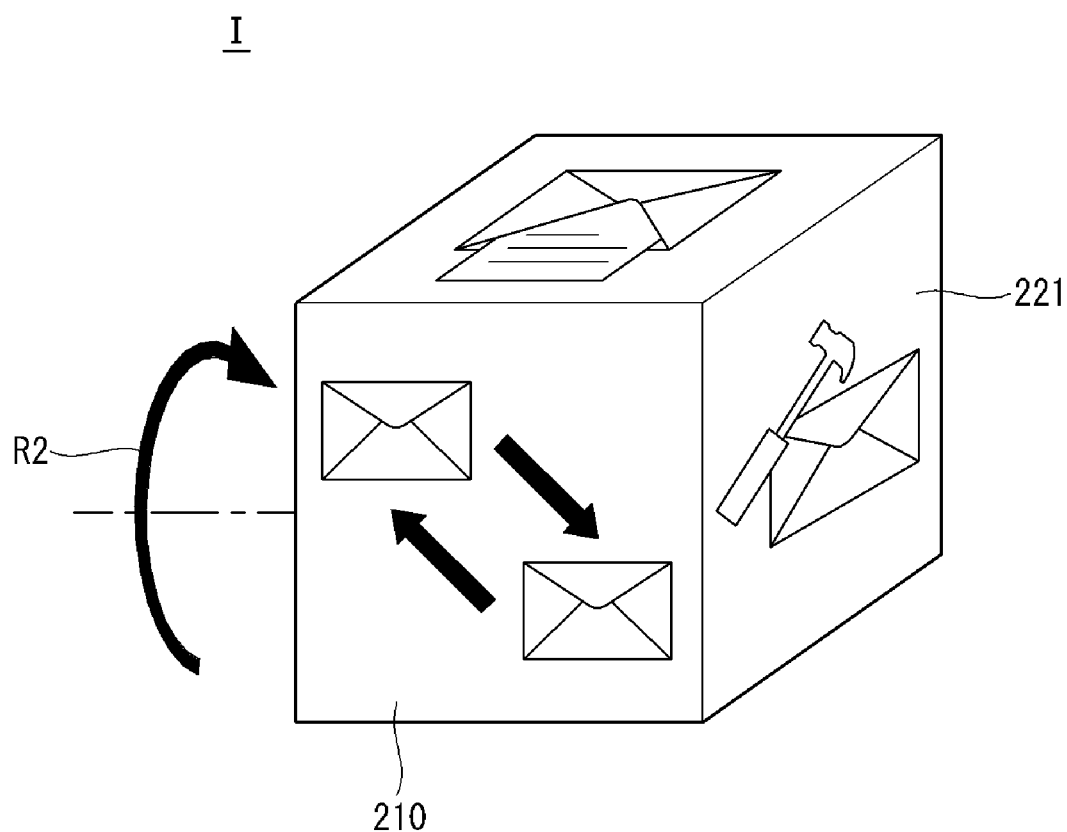

Referring to FIG. 4C, when the polyhedral icon I is rotated in the first direction R1 (as shown in FIG. 4B), a text chat function initially indicated on the fifth related function face 225 illustrated in FIG. 4A may be indicated on the function selection face 210.

Figure 4D:
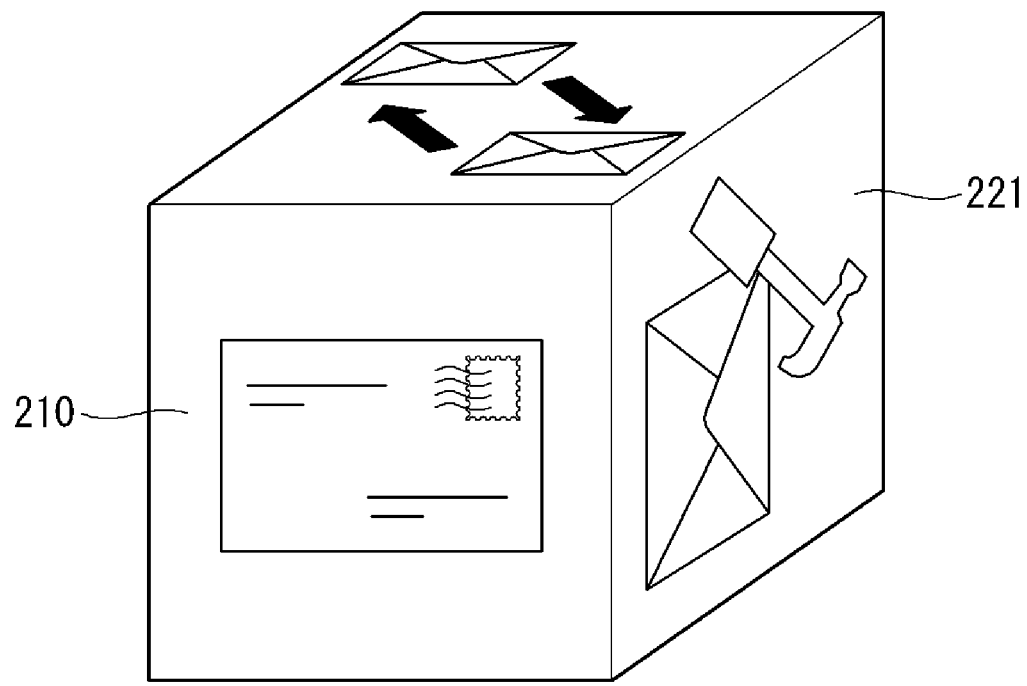
Figure 4E:
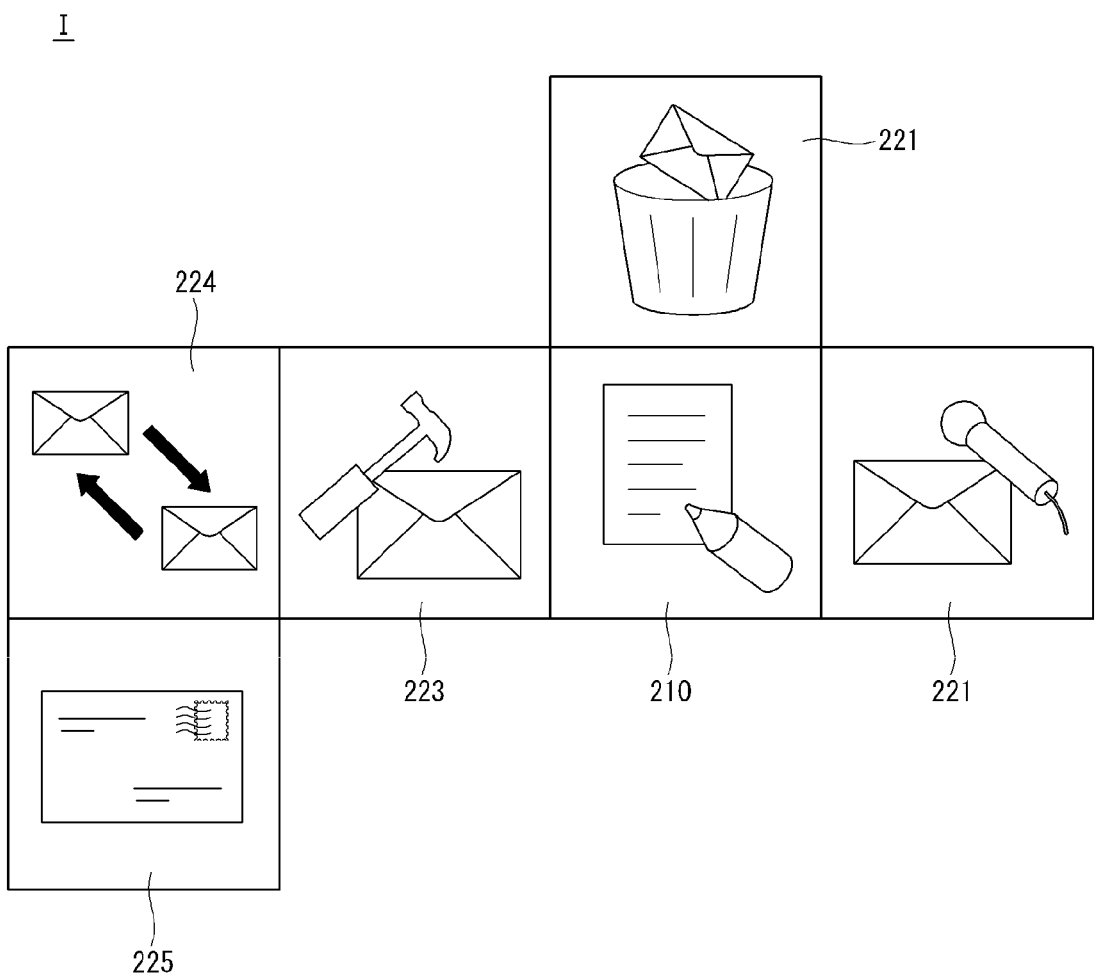
FIG. 4E is a two-dimensional illustration of the functions indicated on the polyhedral icon illustrated in FIGS. 4A, 4B, 4C and 4D.

Referring to FIG. 4D, when the polyhedral icon I is rotated in the second rotating direction R2 illustrated in FIG. 4C, a sent message storage function initially indicated on the fourth related function face 224 illustrated in FIG. 4A may be indicated on the function selection face 210. The polyhedral icon I may be continuously rotated in the second direction R1 if another function is desired.

FIG. 4E is a planar view of the function selection face 210 and the first through fifth related function faces 221 through 225 based on the polyhedral icon I illustrated in FIG. 4A. Related functions are respectively allocated to the faces of the polyhedral icon I, and thus a desired function may be easily selected without passing through multiple tree menus and pop-up menus. Each of the second, third, and fourth icons I2, I3, and I4 may be similarly displayed. Accordingly, desired functions may be grouped and allocated to the polyhedral icons I1, I2, I3, and I4 without being restricted by the number of faces of the polyhedral icon I.

Figure 5:
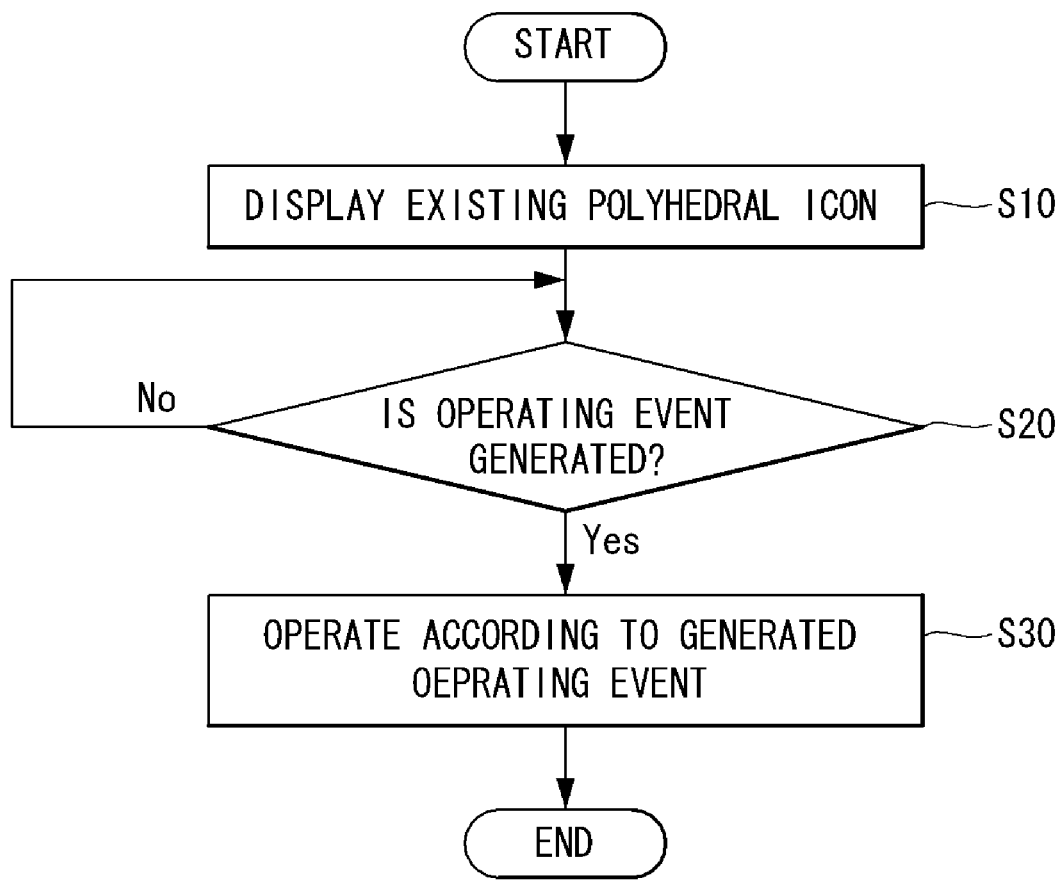
FIG. 5 is a flow chart for a display method of a mobile terminal according to an embodiment of the present invention.

FIG. 5 illustrates a display method of a mobile terminal according to an embodiment of the present invention. The display method of the mobile terminal according to the current embodiment displays existing polyhedral icons in step S10. Polyhedral icons indicating frequently used essential functions of the mobile terminal initially may be established by the terminal manufacturer but may be created, deleted and edited as will be explained in detail later.

A determination is made whether an operating event, such as touching the display, occurs in step S20. Examples of the touch operation and various operating events will be explained in detail later. When the operating event occurs, an operation according to the operating event is performed in step S30. The operation may include rotating, selecting and editing a polyhedral icon.

Figure 6A:
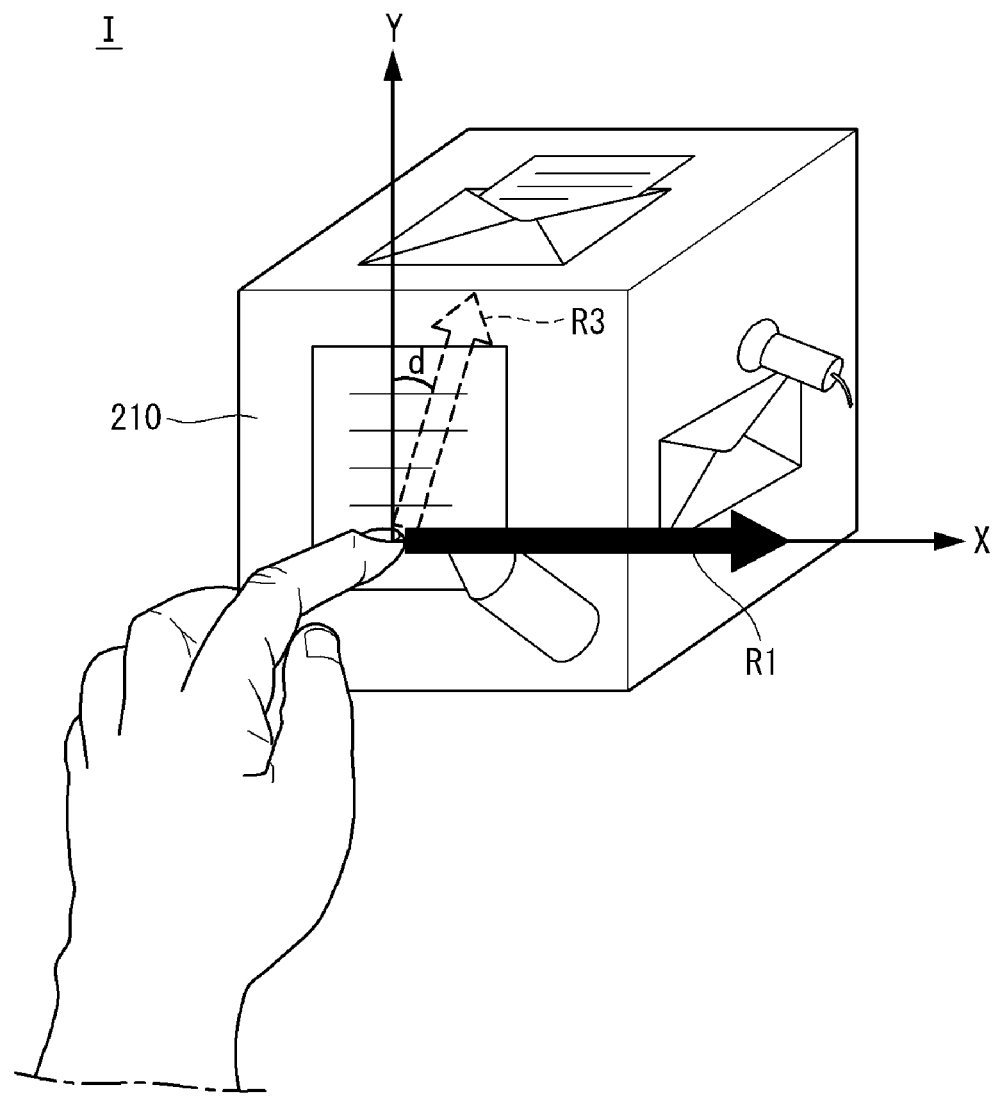
FIGS. 6A, 6B and 6C illustrate an operation of a display method of a mobile terminal according to an embodiment of the present invention.
Figure 6B:
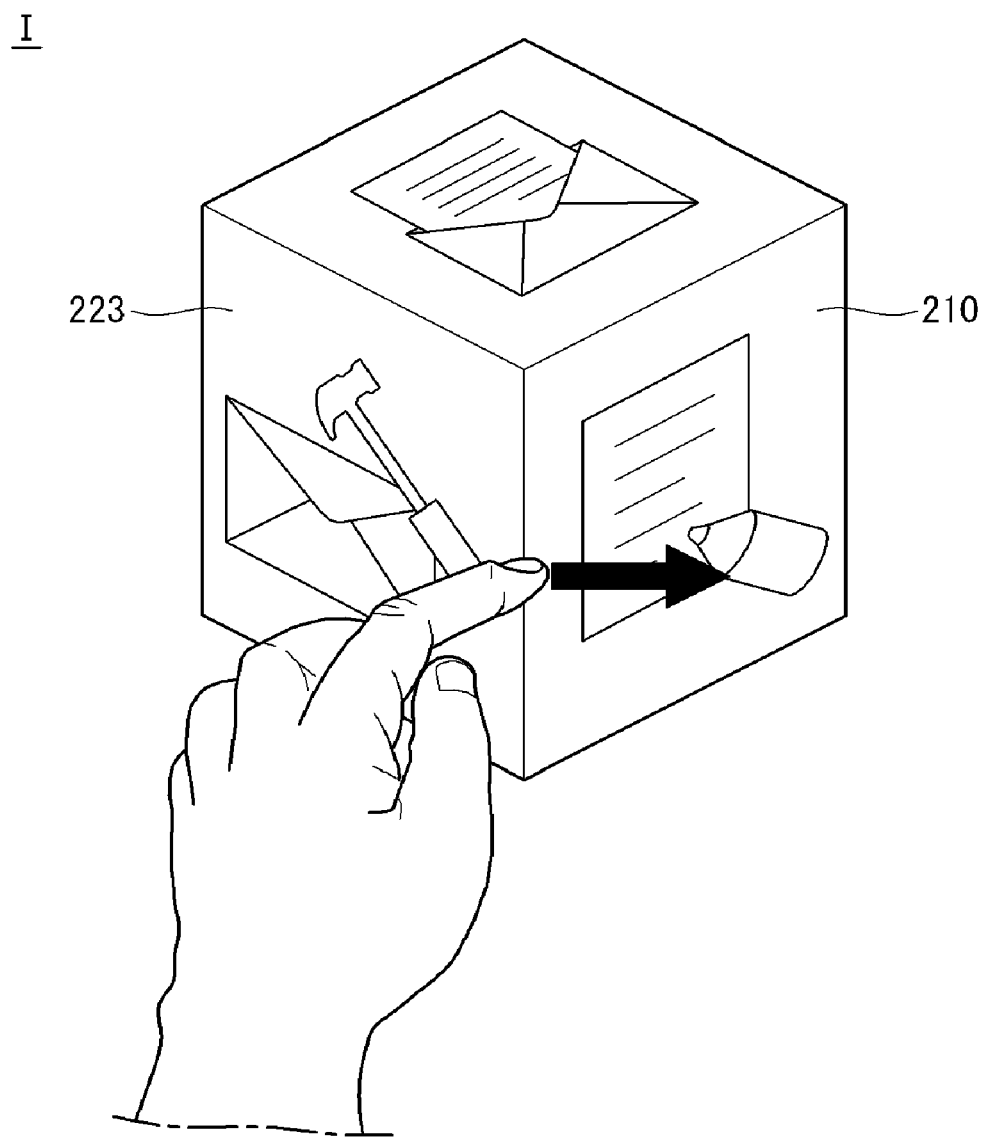
Figure 6C:
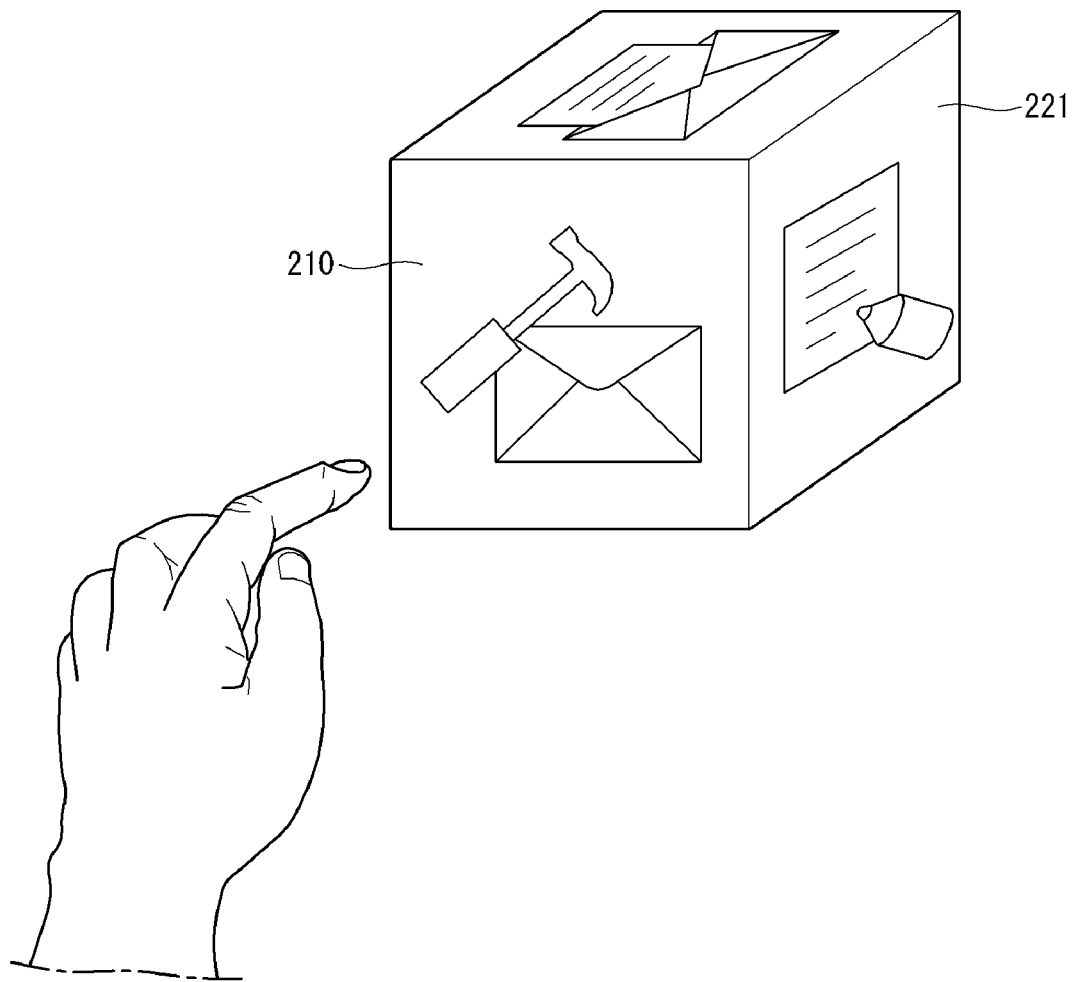
Figure 8:
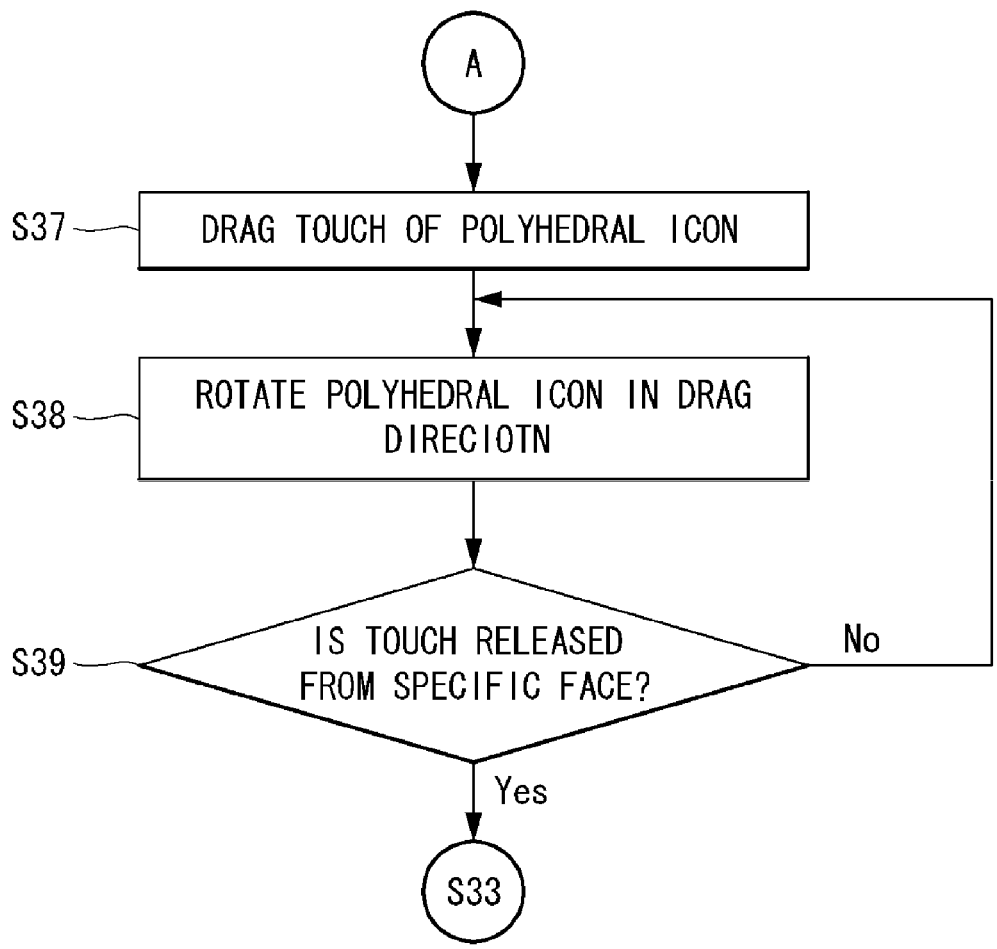

FIGS. 6A, 6B and 6C illustrate an operation of a display method of a mobile terminal according to a one embodiment of the present invention, and FIGS. 7 and 8 show the display method of the mobile terminal illustrated in FIGS. 6A, 6B, and 6C.

Referring to FIG. 6A, the polyhedral icon I is touched and the touch is dragged in the first direction R1 to select a function other than the function currently indicated on the function selection face 210. This operation generally is referred to as a touch-and-drag operation. The polyhedral icon I is rotated in the dragging direction according to the touch-and-drag operation. For example, the controller 180 illustrated in FIG. 1 determines the dragging direction based on a virtual rectangular coordinate system having the initially touched point as the origin. If the dragging direction corresponds to the first rotating direction R1 on the X axis of the virtual rectangular coordinate system, the polyhedral icon I is rotated to the right in the X-axis direction. If the drag and touch is in a random direction, the controller 180 illustrated in FIG. 1 calculates the angles between the random direction and each of the X axis and Y axis and determines which of the two angles forms a narrower angle with the random direction. When the touch and drag is in a third direction R3, as illustrated in FIG. 6A, the Y axis forms a narrower angle d with the random direction, and thus the controller determines that the touch is dragged in the Y-axis direction and the polyhedral icon I is rotated in the Y-axis direction.

FIG. 6B illustrates an operation of rotating the polyhedral icon I in which the function selection face 210 and the third related function face 223 are simultaneously displayed while the polyhedral icon I is rotating. This corresponds to a kind of preview step, and may be repeated by dragging the polyhedral icon vertically or horizontally in increments within a predetermined range and returning the polyhedral icon I to the initial position to preview related function faces 220 illustrated in FIG. 3 located around the function selection face 210.

FIG. 6C illustrates a completely rotated polyhedral icon I according to a touch-and-drag operation and a released touch. Referring to FIG. 6C, the message composing function previously indicated on the function selection face 210 illustrated in FIG. 6A has been moved to the first related function face 221 and the related function face indicating the message environment setting function has become a new function section face 210. To activate the message environment setting function indicated on the function selection face 210 while the polyhedral icon I is rotating, the drag operation is stopped and the touch is released. That is, when touch applied to the display unit 151 illustrated in FIG. 3 is cancelled, the controller 180 illustrated in FIG. 1 executes the function indicated on the function selection face 210 at the moment when the touch is released. Accordingly, the message environment setting function is executed in FIG. 6C.

FIGS. 7 and 8 illustrate a display method of the mobile terminal when the operating event corresponds to a touch-and-drag operation for rotating the polyhedral icon and releasing the touch.

Referring to FIG. 7, the controller 180 illustrated in FIG. 1 detects a touch of the polyhedral icon in step S31. Then, the controller 180 determines whether the touch of the polyhedral icon is released within a short time in step S32. That is, the controller 180 determines whether the function selection face of the polyhedral icon is touched and immediately released without having an additional drag operation.

When it is determined that the touch is released without having an additional operation, the function indicated on the function selection face at the moment when the touch is released in step S33.

The spring-lock is a function of returning to the initially displayed function selection face when a touch is released. When the polyhedral icon is rotated by means of steps S37, S38 and S39 illustrated in FIG. 8, a function indicated on the function selection face, initially selected, is redisplayed after the polyhedral icon is rotated when the spring-lock function is active. Whether the spring-lock function is activated is determined in step S34 (FIG. 7).

When the spring-lock is activated, the polyhedral icon is reversely rotated to return to the initially displayed function selection face in step S35. That is, when the message environment setting function is selected according to rotation of the polyhedral icon although the initial function selection face indicates the message send function, the polyhedral icon is returned to the initially displayed function selection face after the message environment setting function is executed if the spring-lock is activated. The spring-lock is useful when the function indicated on the initial function selection face is used frequently more than other functions. When the spring-lock is not activated, the polyhedral icon is not reversely rotated and maintains the current display state in step S36.

FIG. 8 is a flow chart illustrating an operation of touching and dragging the polyhedral icon. When the polyhedral icon is touched in step S37, the polyhedral icon is rotated in the dragging direction in step S38. The dragging direction has been explained with reference to FIG. 6A.

The controller may determine whether the touch is released from a specific face of the polyhedral icon while the polyhedral icon is rotating in the dragging direction in step S39. The polyhedral icon is continuously rotated if the touch is not released and is continuously dragged. When the rotation is stopped at a specific face of the polyhedral icon and then the touch is released, a function indicated on the specific face is executed in step S33 illustrated in FIG. 7.

According to the display method of the first embodiment of the present invention, it is possible to easily select a specific function using the rotatable polyhedral icon.

Figure 9:
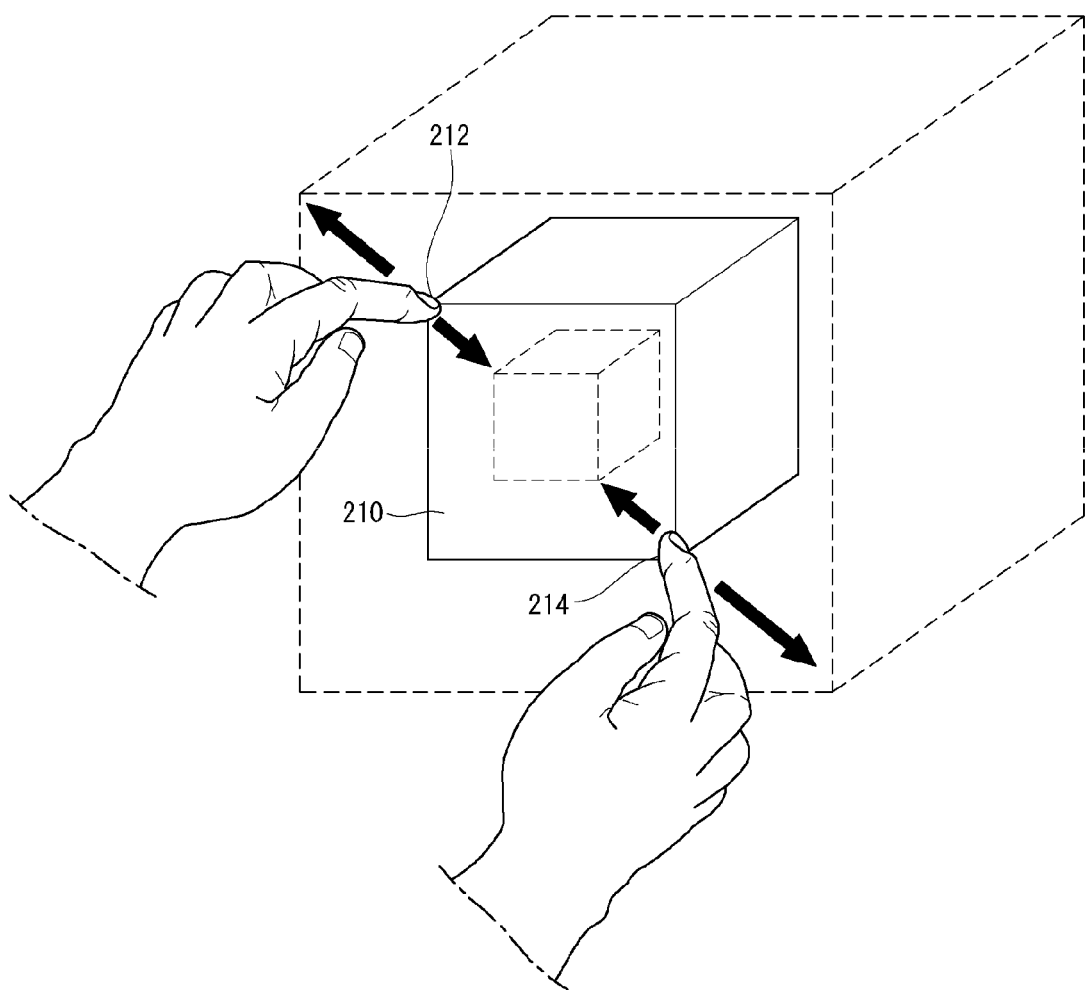
FIG. 9 illustrates an operation of a display method of a mobile terminal according to an embodiment of the present invention.
Figure 10:
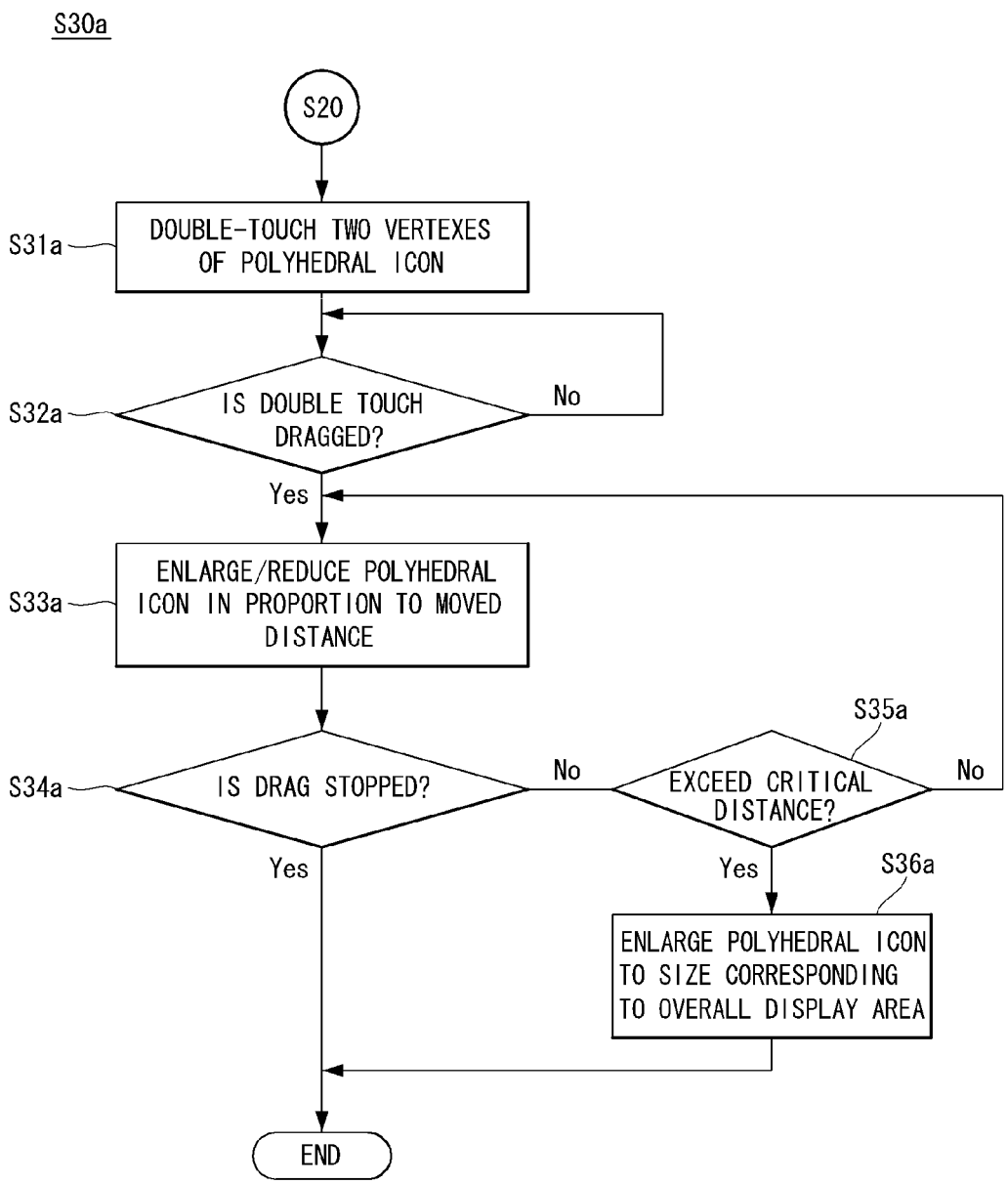
FIG. 10 is a flow chart for the display method of the mobile terminal according to the embodiment of the present invention illustrated in FIG. 9.

FIGS. 9 and 10 illustrate an operation of a display method of a mobile terminal according to another embodiment of the present invention. Only parts distinguished from the display method according to the first embodiment of the present invention are explained. Like reference numerals in the drawings illustrating the display methods according to the different embodiments of the present invention denote like parts and "a" is added to reference numerals which denote parts different from those of the first embodiment of the present invention.

Referring to FIG. 9, the display size of the polyhedral icon I may be changed when first and second vertexes 212 and 214 of the function selection face 210, which are located in diagonally on the function selection face 210, are double-touched and dragged. Double touch means touching two points of the display unit 151 illustrated in FIG. 3 simultaneously or touching the two points within a short time interval. When a double touch occurs, the controller 180 illustrated in FIG. 1 detects the coordinates of the two points of the display unit 151 illustrated in FIG. 3.

The first and second vertexes 212 and 214 are double-touched and then dragged such that the first and second vertexes 212 and 214 become closer to or farther apart from each other. The size of the polyhedral icon I including the function selection face 210 increases when the touched first and second vertexes 212 and 214 are dragged further apart from each other and decreases when the touched first and second vertexes 212 and 214 are dragged closer to each other.

FIG. 10 is a flow chart illustrating the operation of double-touching two vertexes of the polyhedral icon, which in the above embodiment are located in a diagonal direction of the polyhedral icon. When the two vertexes of the polyhedral icon are double-touched in step S31a, it is determined whether the double-touched vertexes are dragged in step S32a.

When the double-touched vertexes are dragged and moved, the size of the polyhedral icon is increased or decreased according to the dragged distance in step S33a. A determination is made whether the operation of dragging the double-touched vertexes is stopped in step S34a. The operation of varying the size of the polyhedral icon is ended when the drag operation is stopped.

If the drag operation continues, a determination is made whether the dragged distance exceeds a predetermined critical distance in step S35a.

The polyhedral icon may be increased in size to the overall display area when the dragged distance exceeds the critical distance in step S36a. When the vertexes are double-touched and dragged and the dragged distance exceeds the predetermined critical distance, gradual magnification of the polyhedral icon is stopped and the polyhedral icon is magnified to a size identical to that of the overall display area of the display unit.

As described above, the size of the polyhedral icon may be easily controlled through a double-touch-and-drag operation.

Figure 11:
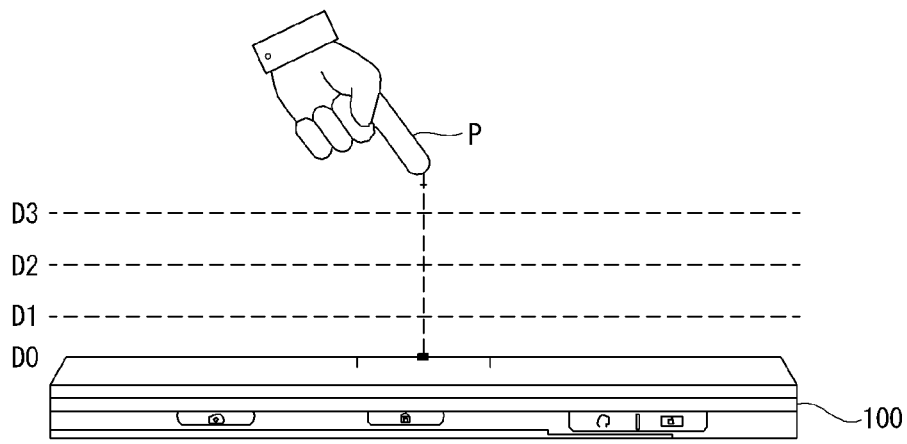
FIG. 11 illustrates an operation of a display method of a mobile terminal according to an embodiment of the present invention.
Figure 12:
FIG. 12 is a flow chart for the display method of the mobile terminal according to the embodiment of the present invention illustrated in FIG. 11.

FIGS. 11 and 12 illustrate an operation of a display method of a mobile terminal according to another embodiment of the present invention. Only parts distinguished from the display method according to the first embodiment of the present invention are explained. Like reference numerals in the drawings illustrating the display methods according to the embodiments of the present invention denote like parts and "b" is added to reference numerals which denote parts different from those of the first embodiment of the present invention.

Referring to FIG. 11, the sensing unit 140 in FIG. 1 may be used to adjust the size of a polyhedral icon according to another embodiment.

The proximity sensor may output a proximity signal according to a degree to which a pointer P approaches the display unit 151 of the mobile terminal illustrated in FIG. 3. That is, the proximity sensor generates proximity signals in response to distances D1, D2, and D3 between the pointer P and the surface of the mobile terminal 100 and the proximity signals may be used for various operations of the mobile terminal 100.

FIG. 12 is a flow chart illustrating an operation of adjusting the size of the polyhedral icon according to proximity touch. When the proximity sensor generates a signal representing that a touch on the display unit 151 illustrated in FIG. 3 is removed from the display unit 151 after maintaining the touch for a specific period of time in step S31b, the size of the polyhedral icon is increased at a specific rate in step S32b.

As described above, the size of the polyhedral icon may be easily increased using the proximity sensor.

Figure 13A:
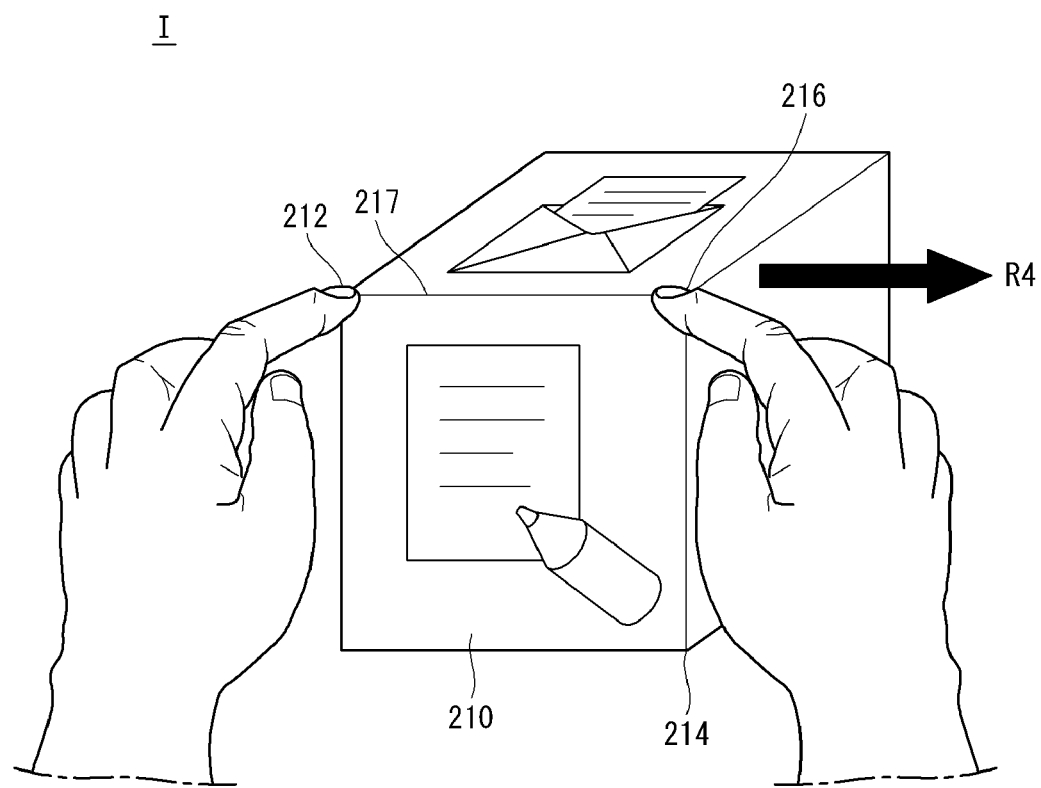
FIGS. 13A and 13B illustrate an operation of a display method of a mobile terminal according to an embodiment of the present invention.
Figure 13B:
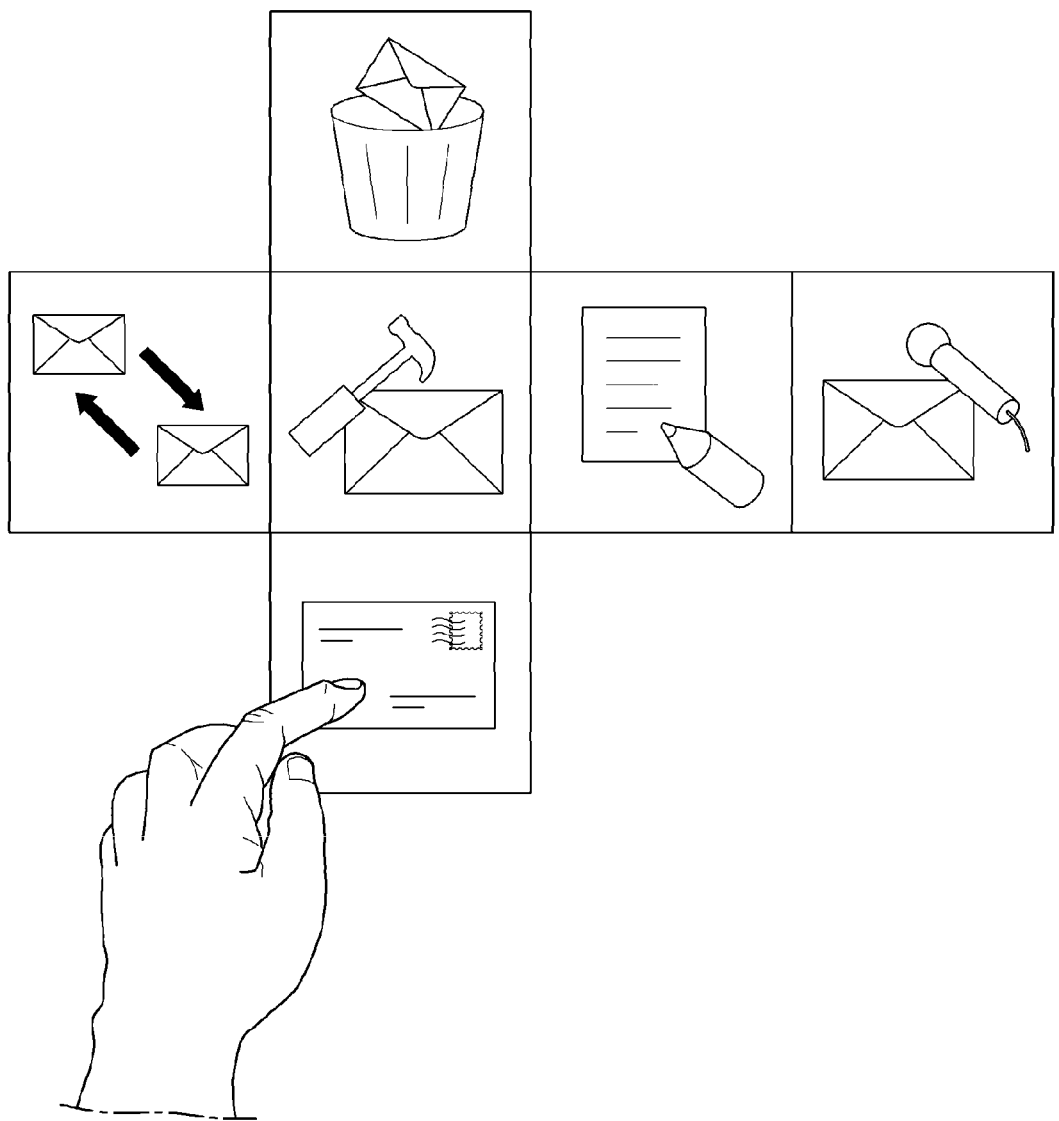
Figure 14:
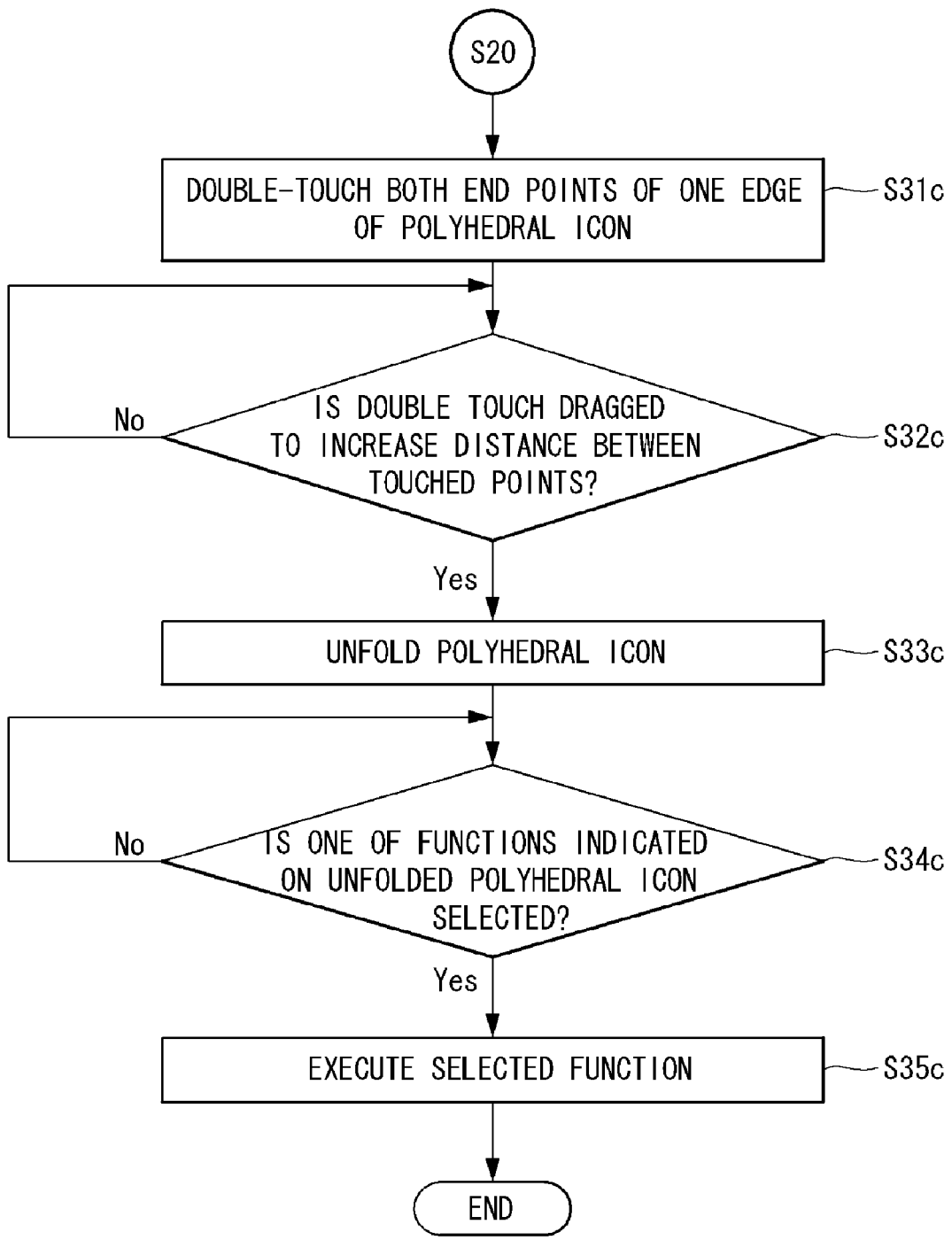
FIG. 14 is a flow chart illustrating the display method of the mobile terminal according to the embodiment of the present invention illustrated in FIGS. 13A and 13B.

FIGS. 13A and 13B illustrate another aspect of the present invention and FIG. 14 is a flow chart illustrating the display method of the mobile terminal illustrated in FIGS. 13A and 13B. Only parts distinguished from the display method according to the first embodiment of the present invention are explained. Like reference numerals in the drawings illustrating the display methods according to the embodiments of the present invention denote like parts and "c" is added to reference numerals which denote parts different from those of the first embodiment of the present invention.

Referring to FIG. 13A, the polyhedral icon I may be unfolded when both end points 212 and 216 of an edge 217 are double-touched and dragged in the display method. The operation illustrated in FIG. 13A is distinguished from the operation of double-touching the first and second vertexes 212 and 214 to vary the size of the polyhedral icon I illustrated in FIG. 9, in that the first and third vertexes 212 and 216 corresponding to both end points of the edge 217 of the polyhedral icon I are double-touched.

FIG. 14 is a flow chart illustrating the operation of double-touching both end points of an edge of the polyhedral icon and then dragging the touched end points. Both end points of one edge of the polyhedral icon are double-touched in step S31c. A determination is made whether the touched points are dragged apart from each other in step S32c. The polyhedral icon is unfolded to display a planar view when the double touch is dragged such that the touched points become distant from each other in step S33c. The polyhedral icon is two-dimensionally unfolded on the display unit 151 illustrated in FIG. 3, and all the functions on the polyhedral icon become visible without rotating the polyhedral icon as illustrated in FIG. 13B.

If one of the functions indicated on the unfolded polyhedral icon is selected as described in step S34c, through touch or key input, the selected function is executed in step S35c.

As described above, the polyhedral icon may be two-dimensionally unfolded to view all the functions on the polyhedral icon and to select a desired function.

Figure 15A:
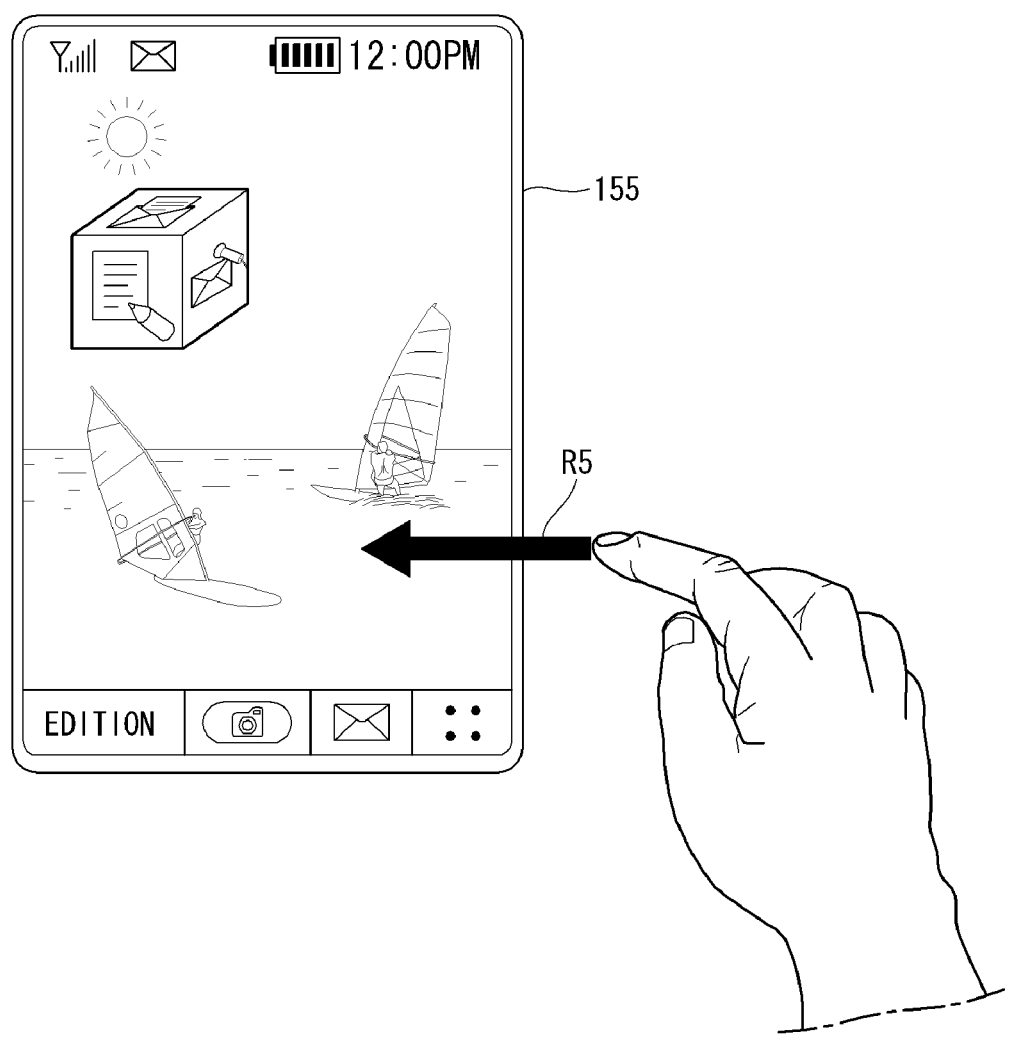
FIGS. 15A and 15B illustrate an operation of a display method of a mobile terminal according to an embodiment of the present invention.
Figure 15B:
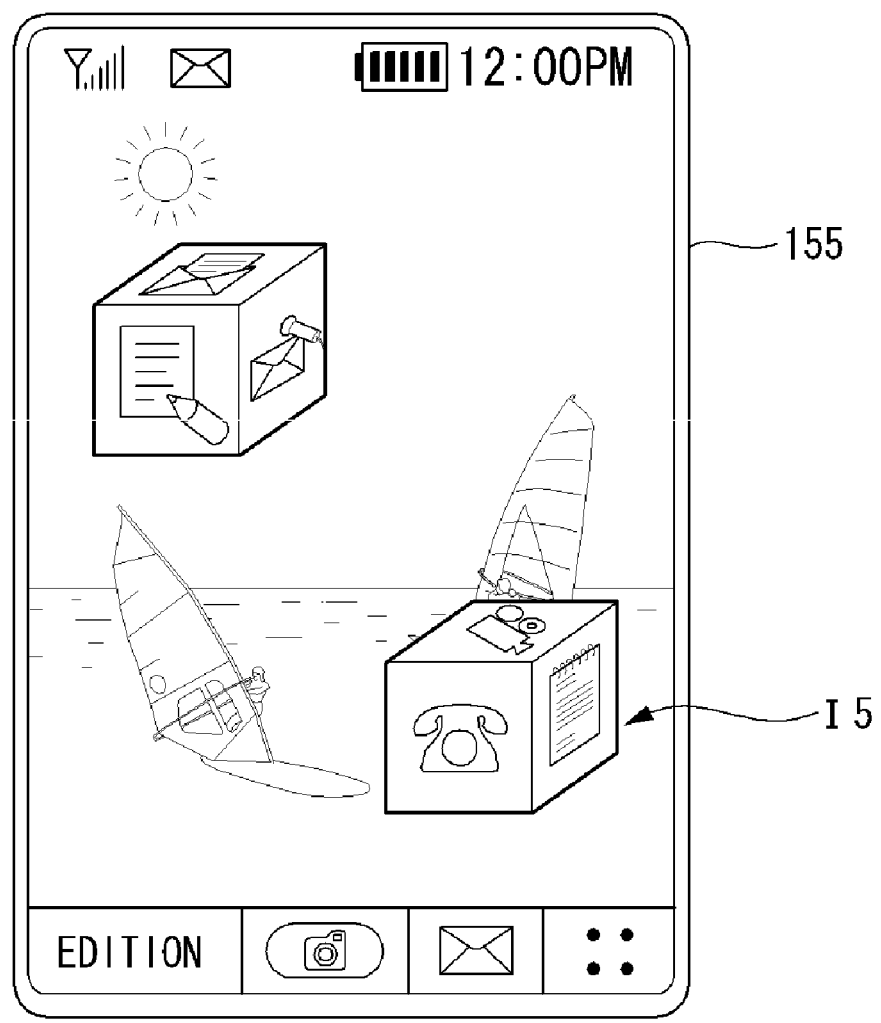
Figure 16:
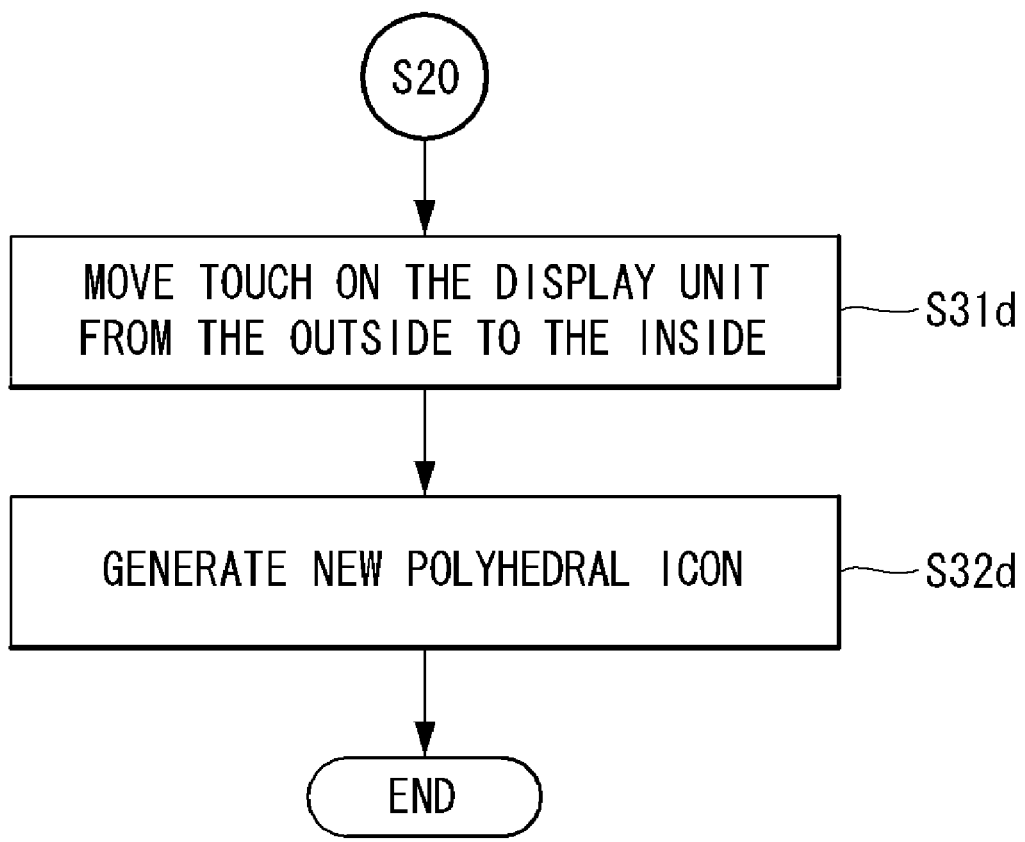
FIG. 16 is a flow chart for the display method of the mobile terminal according to the embodiment of the present invention illustrated in FIGS. 15A and 15B.

FIGS. 15A and 15B illustrate an operation of a display method of a mobile terminal according to a another aspect of the present invention and FIG. 16 is a flow chart illustrating the display method of the mobile terminal illustrated in FIGS. 15A and 15B. Only parts distinguished from the display method according to the first embodiment of the present invention are explained. Like reference numerals in the drawings illustrating the display methods according to the embodiments of the present invention denote like parts and "d" is added to reference numerals which denote parts different from those of the first embodiment of the present invention.

Referring to FIGS. 15A and 15B, a new polyhedral icon is generated when the display is touched and the touch is dragged over the boundary 155 of the display unit 151 from the outside to the inside of the boundary 155. That is, when the touch crosses from the outside to the inside of the boundary 155 in a fifth direction R5, the controller 180 illustrated in FIG. 1 generates a new polyhedral icon I5.

FIG. 16 is a flow chart illustrating the operation of touching the display unit while passing over the boundary of the display unit.

Referring to FIG. 16, when the touch is dragged over the boundary of the display unit from the outside to the inside of the boundary of the display unit in step S31d, a new polyhedral icon is generated in step S32d.

As described above, according to another embodiment of the present invention, a polyhedral icon may be generated through a simple touch operation.

Figure 17A:
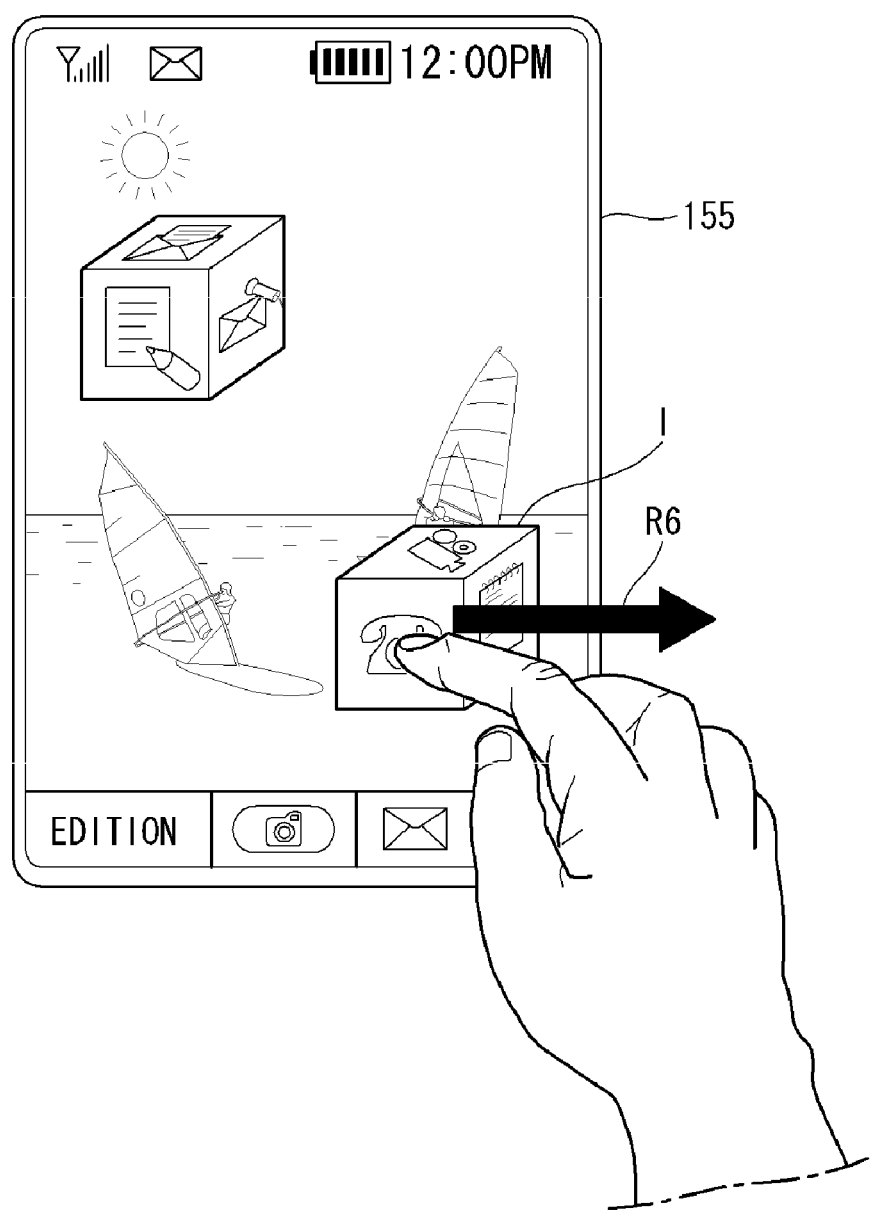
FIGS. 17A and 17B illustrate an operation of a display method of a mobile terminal according to an embodiment of the present invention.
Figure 17B:
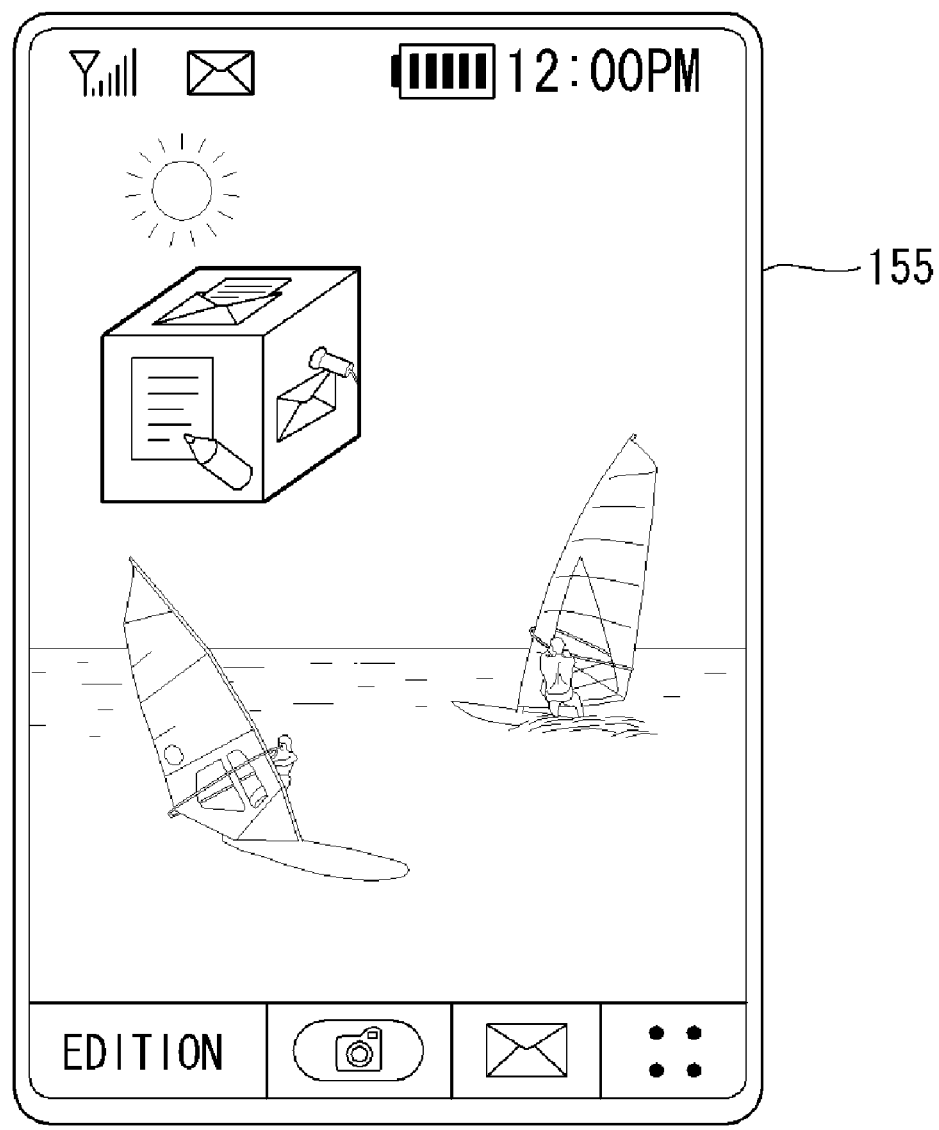
Figure 18:
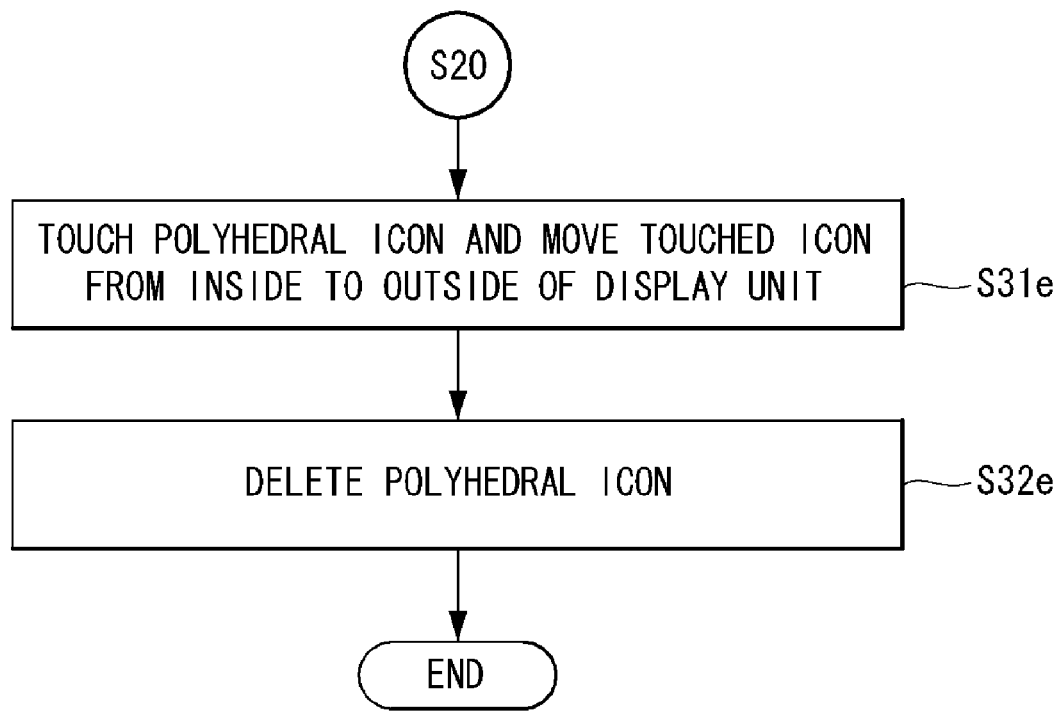
FIG. 18 is a flow chart for the display method of the mobile terminal according to the embodiment of the present invention illustrated in FIGS. 17A and 17B.

FIGS. 17A and 17B illustrate an operation of a display method of a mobile terminal according to another aspect of the present invention and FIG. 18 is a flow chart illustrating the display method of the mobile terminal illustrated in FIGS. 17A and 17B. Only parts distinguished from the display method according to the first embodiment of the present invention are explained. Like reference numerals in the drawings illustrating the display methods according to the embodiments of the present invention denote like parts and "e" is added to reference numerals which denote parts different from those of the first embodiment of the present invention.

Referring to FIGS. 17A and 17B, a polyhedral icon is deleted when a touch passes over the boundary 155 of the display unit 151 illustrated in FIG. 3 from the inside to the outside of the boundary 155. That is, when a polyhedral icon I is touched and moved from the inside to the outside of the boundary 155 of the display unit 151 in a sixth direction R6 while maintaining the touch, the polyhedral icon I is deleted from the display unit 151.

FIG. 18 is a flow chart illustrating the operation of touching the display unit while passing over the boundary of the display unit.

Referring to FIG. 18, when a polyhedral icon is touched and moved from the inside to the outside of the display unit in step S31e, the touched polyhedral icon is deleted in step S32e.

As described above, a polyhedral icon may be deleted through a simple touch operation.

Figure 19A:
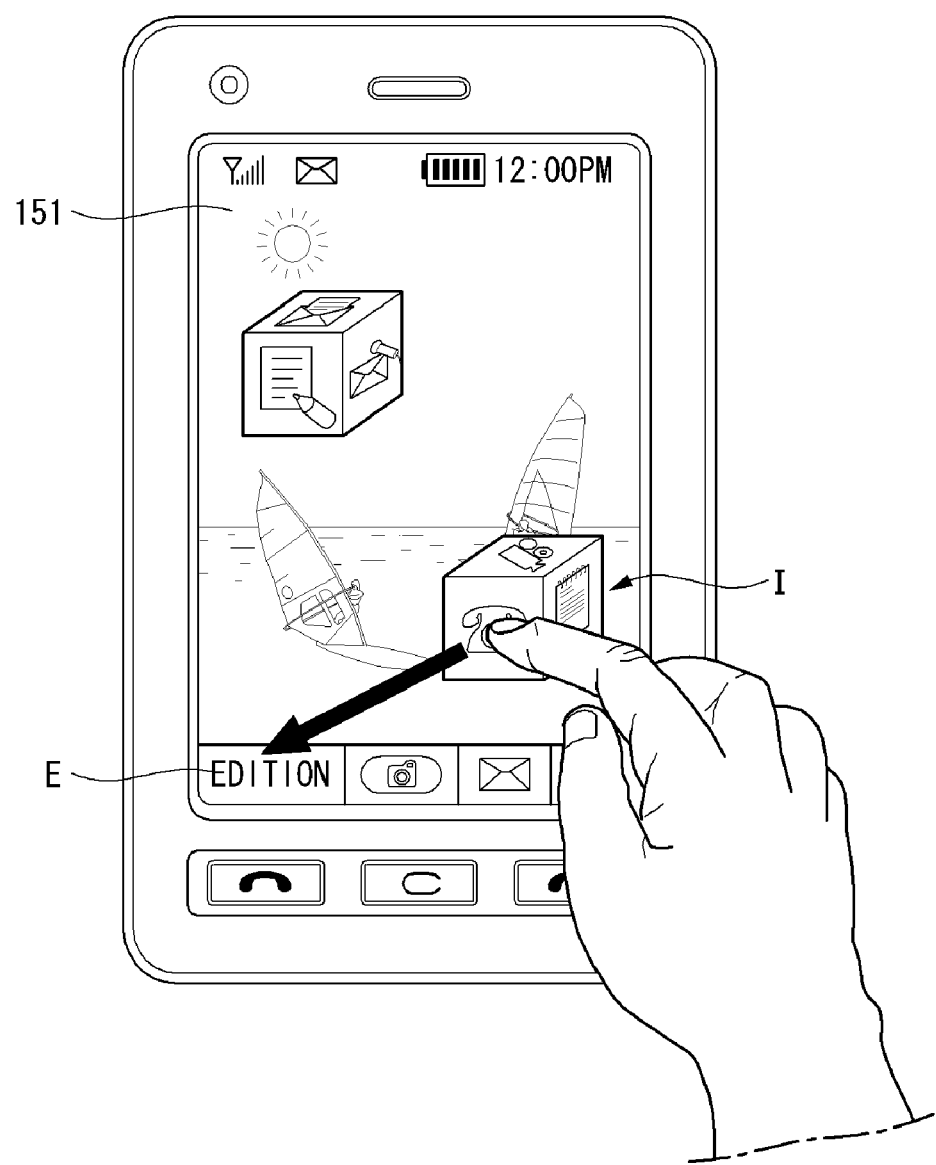
FIGS. 19A through 19H illustrate an operation of a display method of a mobile terminal according to an embodiment of the present invention.
Figure 19B:
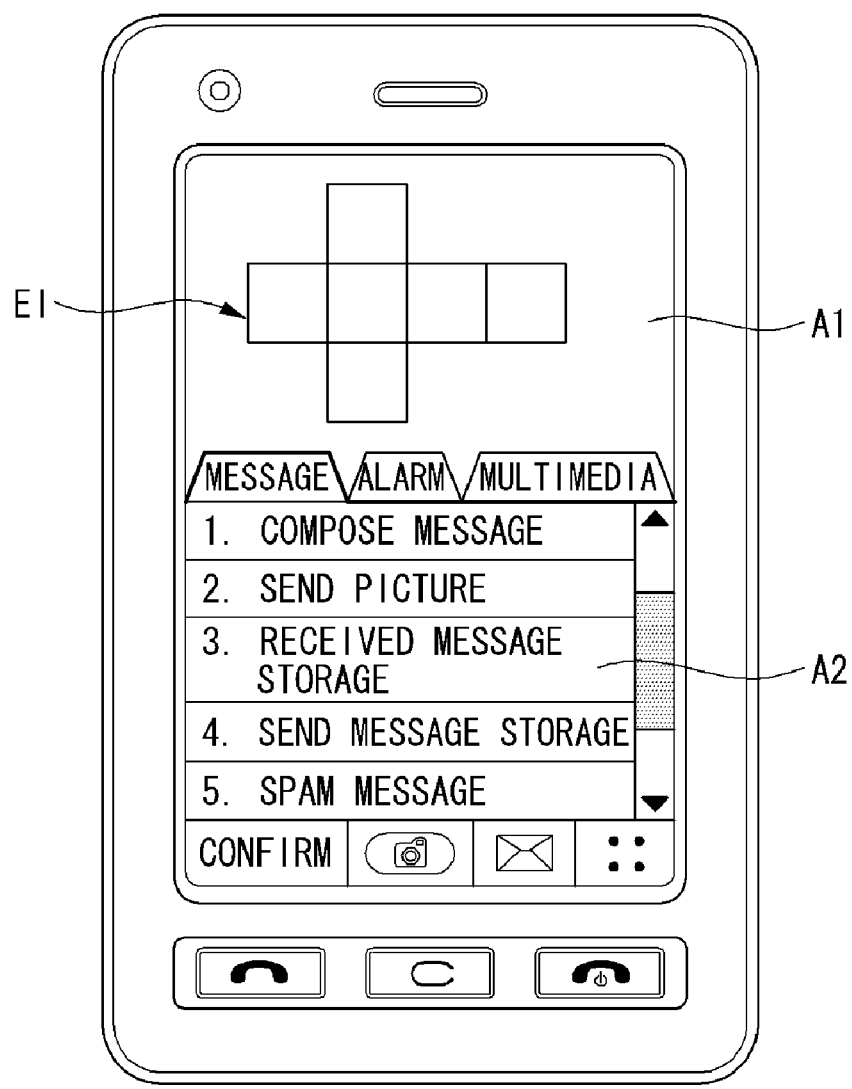
Figure 19C:
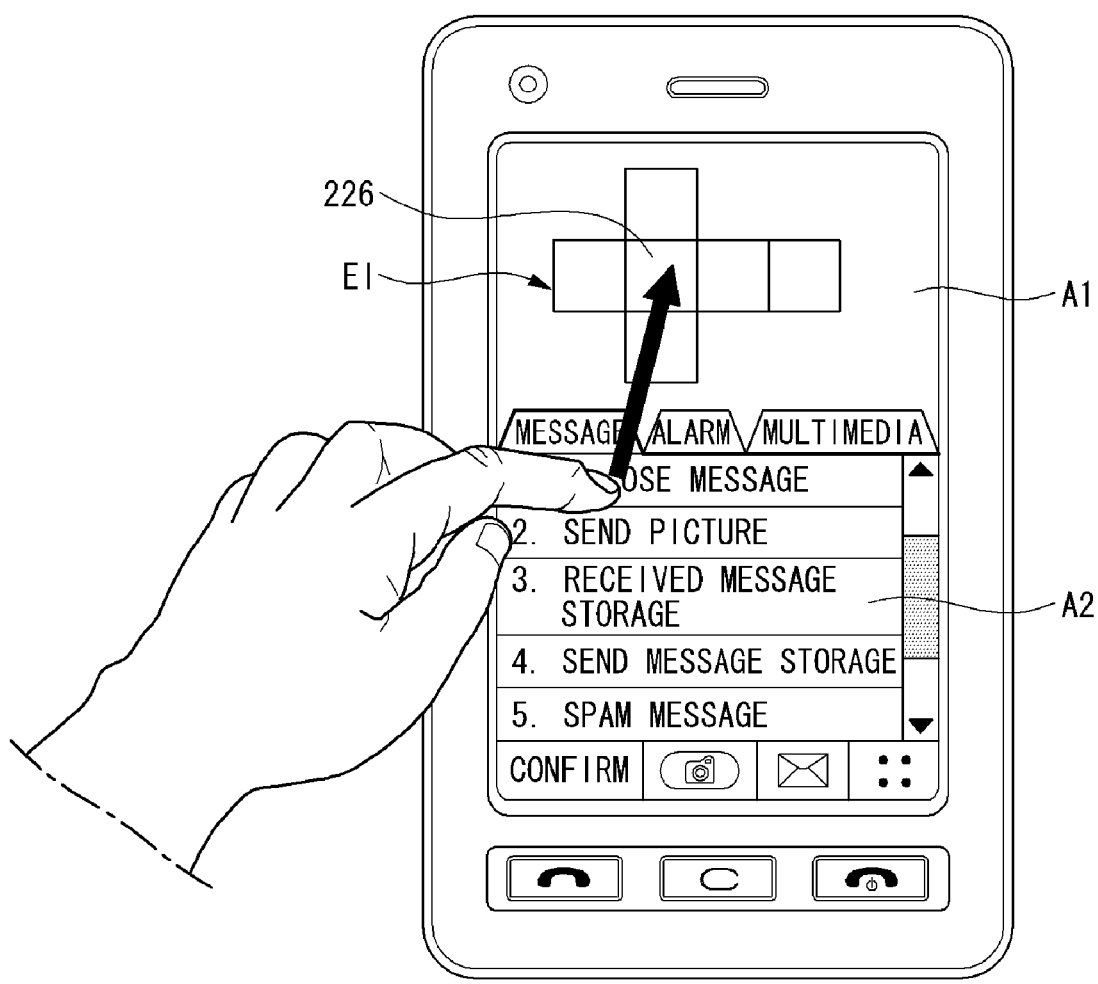
Figure 19D:
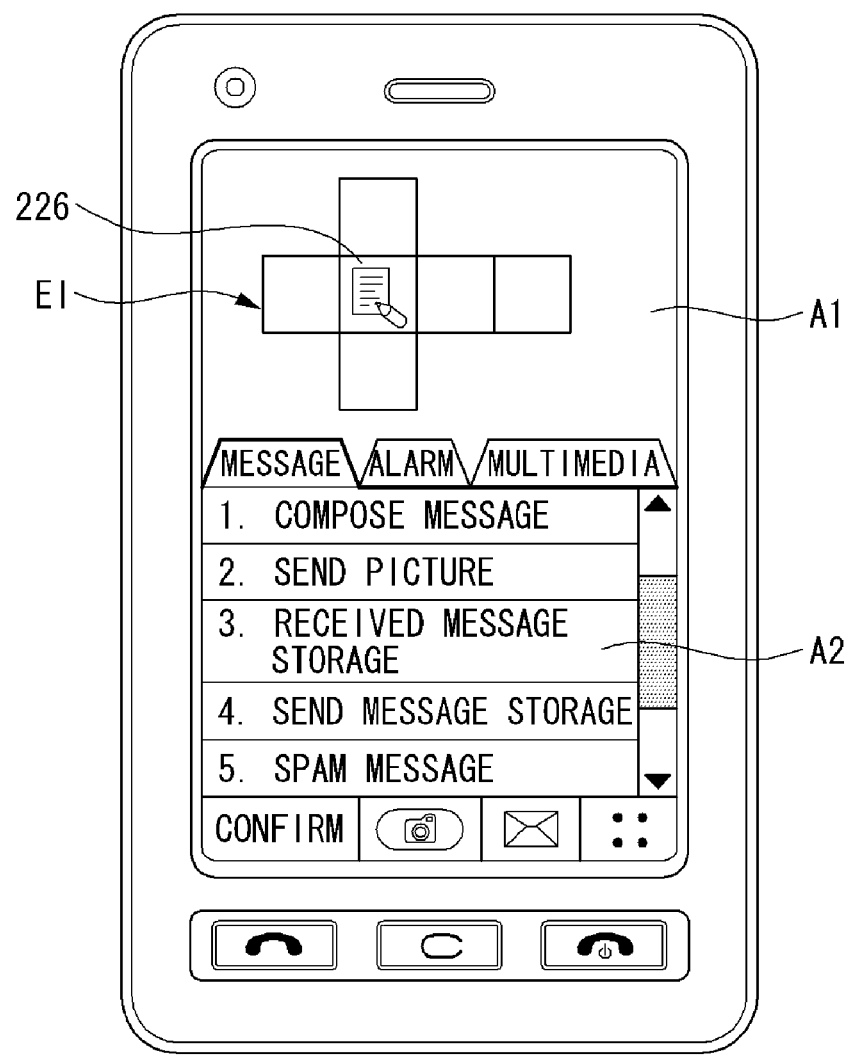
Figure 19E:
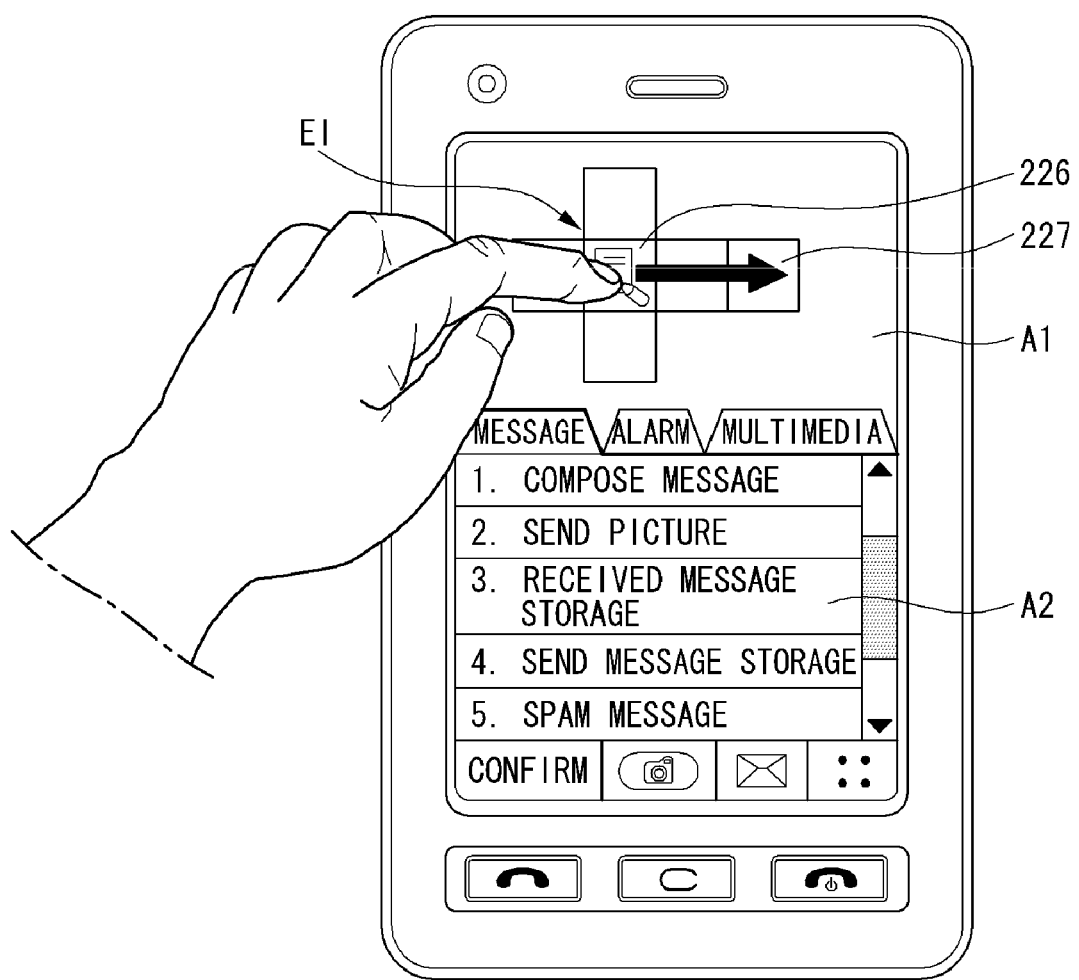
Figure 19F:
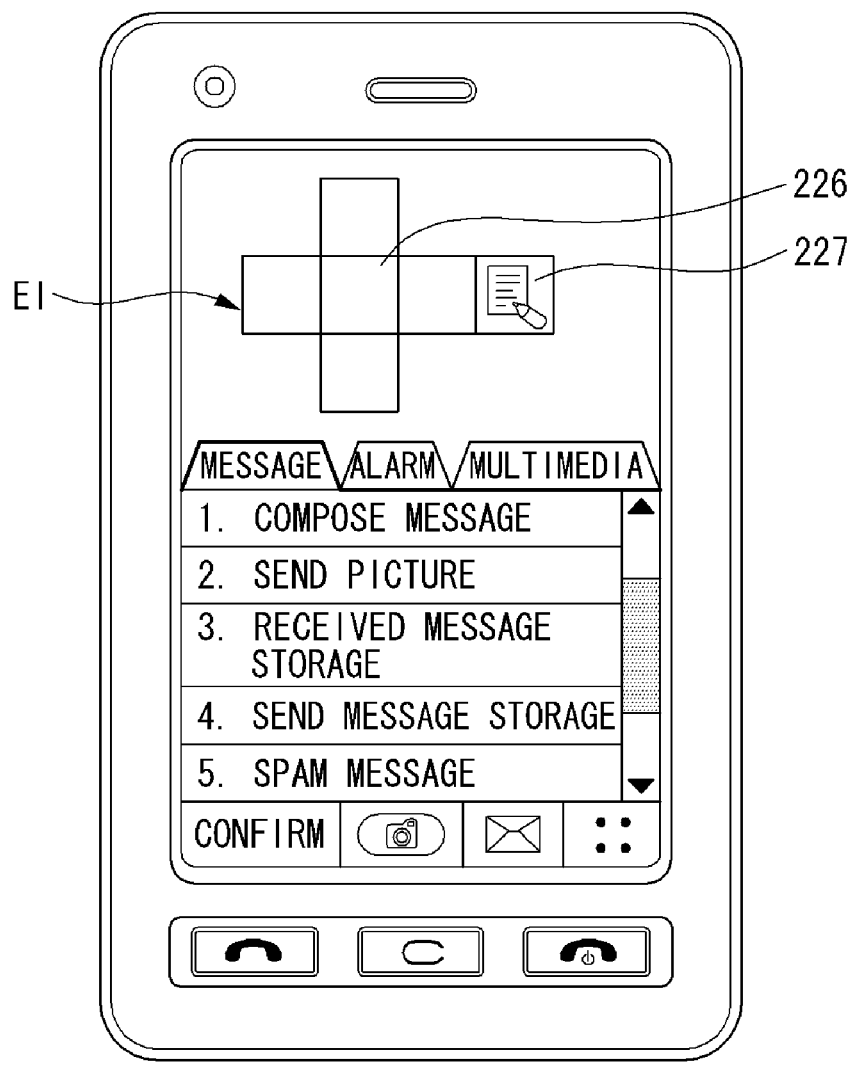
Figure 19G:
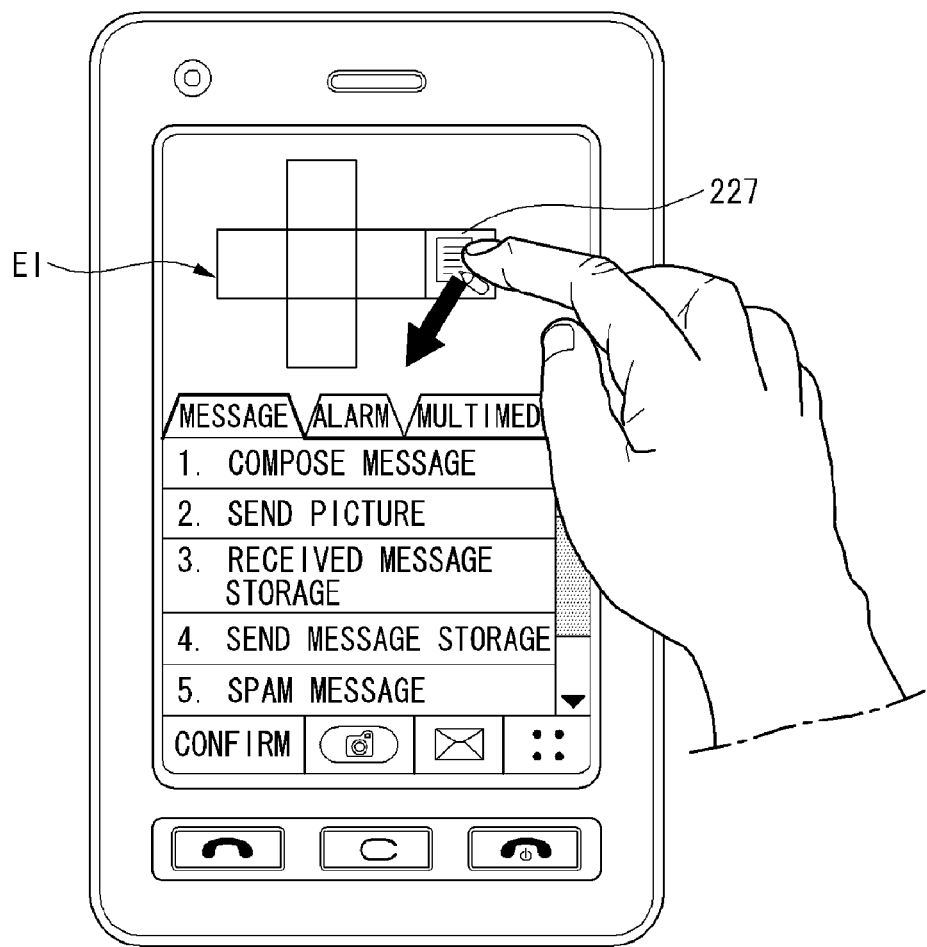
Figure 19H:
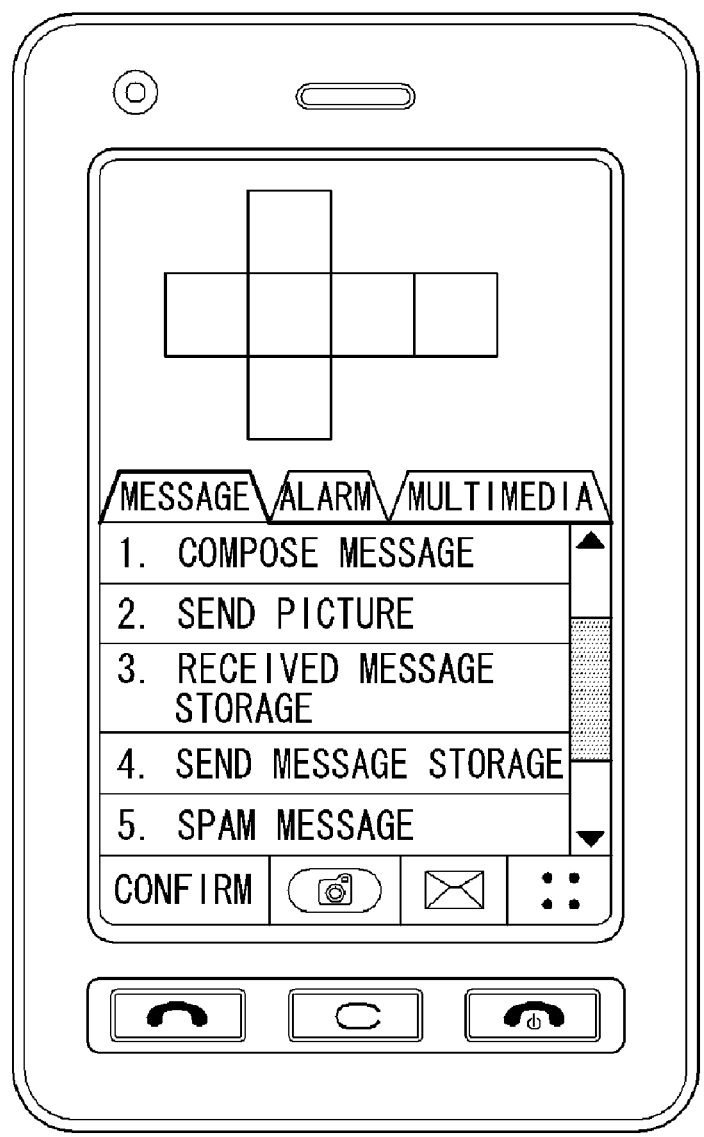
Figure 20:
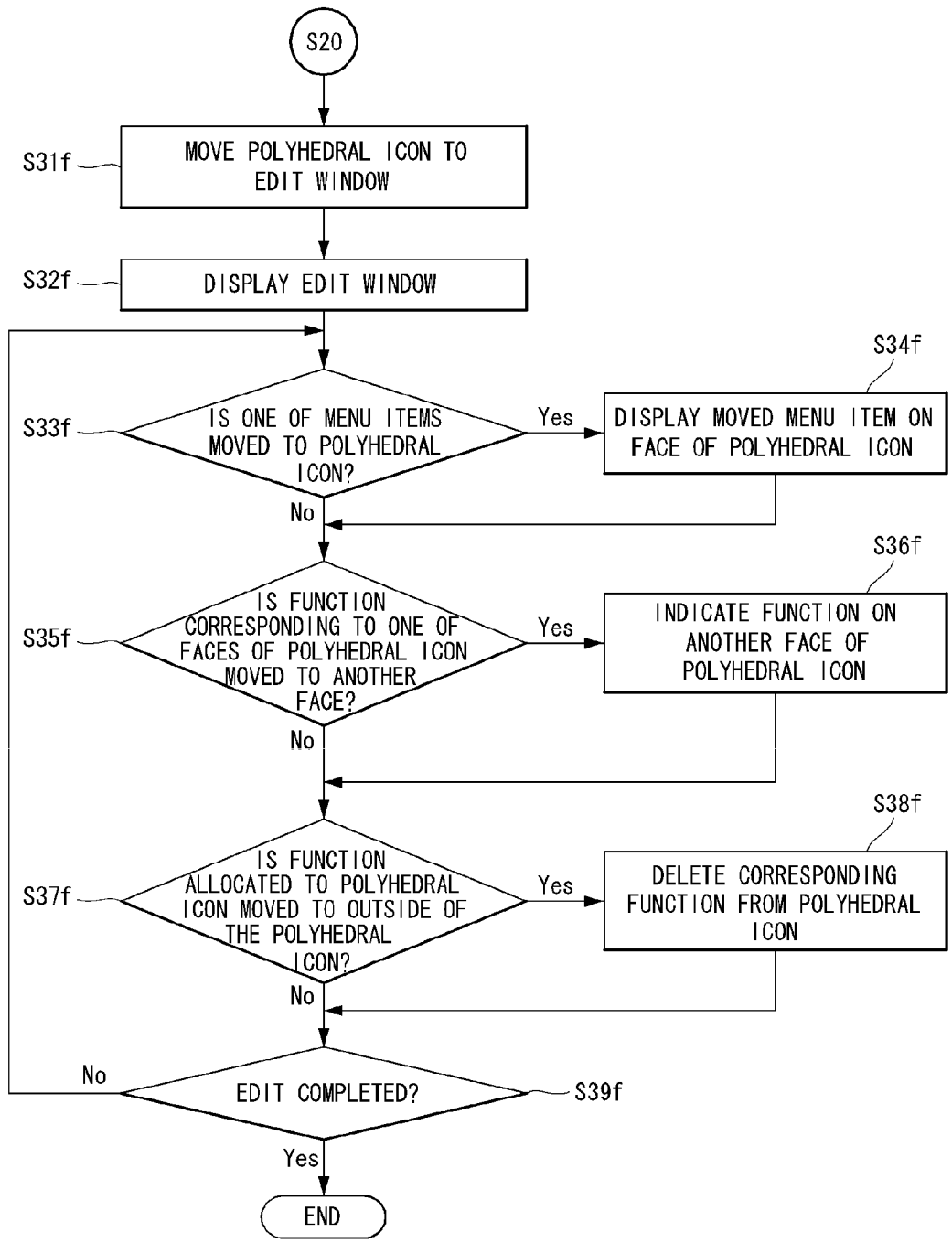
FIG. 20 is a flow chart illustrating the display method of the mobile terminal according to the embodiment of the present invention illustrated in FIGS. 19A through 19H.

FIGS. 19A through 19H illustrate an operation of a display method of a mobile terminal according to another aspect of the present invention and FIG. 20 is a flow chart illustrating the display method of the mobile terminal illustrated in FIGS. 19A through 19H. Only parts distinguished from the display method according to the first embodiment of the present invention are explained. Like reference numerals in the drawings illustrating the display methods according to the embodiments of the present invention denote like parts and "f" is added to reference numerals which denote parts different from those of the first embodiment of the present invention.

Referring to FIG. 19A, the function assigned to the polyhedral icon I may be edited by dragging and dropping the polyhedral icon I to an edit region E.

Referring to FIG. 19B, when the polyhedral icon I illustrated in FIG. 19A is dragged and dropped to the edit region E illustrated in FIG. 19A, the display unit 151 displays an edit window divided into a first region A1 and a second region A2. An unfolded polyhedral icon EI is displayed in the first region A1 and menus including functions applicable to the unfolded polyhedral icon EI are displayed in the second region A2.

Referring to FIGS. 19C and 19D, a message composing menu among the menus displayed in the second region A2 may be dragged and dropped to a first position 226 corresponding to one of faces of the unfolded polyhedral icon EI. The message composing function dropped to the first position 226 of the unfolded polyhedral icon EI may be selected and activated when the unfolded polyhedral icon EI is returned to the three-dimensional polyhedral icon I illustrated in FIG. 19A.

Referring to FIGS. 19E and 19F, the message composing function dropped to the first position 226 of the unfolded polyhedral icon EI may be moved by dragging and dropping the function to a second position 227 of the unfolded polyhedral icon EI.

Referring to FIGS. 19G and 19H, the message composing function indicated on the second position 227 of the unfolded polyhedral icon EI is dragged and dropped to a region outside the unfolded polyhedral icon EI such that the message composing function may be deleted from the unfolded polyhedral icon EI.

FIG. 20 is a flow chart illustrating editing operations performed on the polyhedral icon. When a drag-and-drop operation is performed to move the polyhedral icon to an editing window in step S31f, the edit window is displayed in step S32f.

A determination is made whether one of functions corresponding to a menu item is moved to one of faces of the polyhedral icon in step S33f. When the move operation is performed, the moved function is indicated on the face of the polyhedral icon in step S34f.

If moving a function indicated on a face of the polyhedral icon to another face of the polyhedral icon is performed in step S35f, the function is moved to the other face of the polyhedral icon and indicated thereon in step S36f.

If moving a function indicated on the polyhedral icon to the outside of the polyhedral icon is performed in step S37f, the function is deleted from the polyhedral icon when the move operation is performed in step S38f.

A determination is made whether the edition is completed in step S39f.

As described above, the polyhedral icon may be easily edited and used.

Figure 21:
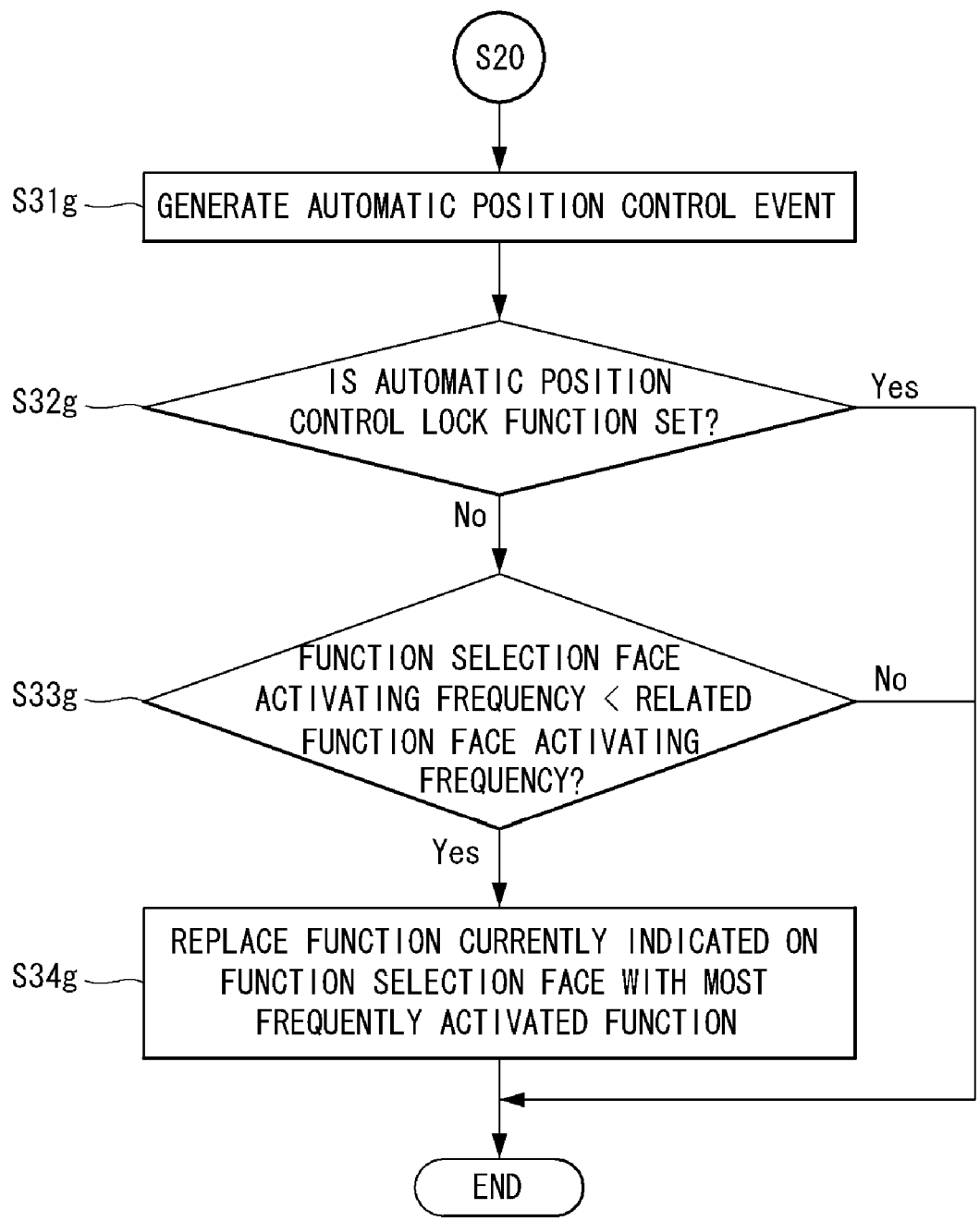
FIG. 21 is a flow chart illustrating a display method of a mobile terminal according to an embodiment of the present invention.

FIG. 21 is a flow chart illustrating a display method of a mobile terminal according to another aspect of the present invention. Only parts distinguished from the display method according to the first embodiment of the present invention are explained. Like reference numerals in the drawings illustrating the display methods according to the embodiments of the present invention denote like parts and "g" is added to reference numerals which denote parts different from those of the first embodiment of the present invention.

Referring to FIG. 21, a determination is made whether an automatic position control lock function is set in step S32g when an automatic position control event is generated in step S31g. When a polyhedral icon is initially displayed, the polyhedral icon may be positioned so that a default function is displayed on the function selection face. If the automatic position control lock is set, then the default function will be displayed on the function selection face.

If the automatic position control lock function is not set, then the controller 151 may compare the frequencies of executing the function displayed on the function selection face with the frequencies of executing the functions of the related faces in step S33g.

The function having the greatest execution frequency may then be displayed on the function selection face at step S34g.

As described above, according to the display method of this aspect of the present invention, a most frequently used function may be indicated on the function selection face corresponding to the front face of the polyhedral icon, and thus the polyhedral icon may be easily used.

Although functions related to transmission and receiving of messages have been described in the aforementioned embodiments, various functions may be allocated to the polyhedral icon.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for displaying executable functions on a touch screen display, the method comprising:
 displaying at least one three-dimensional polyhedral icon on the touch screen display, the at least one polyhedral icon being rotatable and comprising at least two faces, wherein at least one of the at least two faces is assigned an executable function;
 identifying at least one operation performed on the touch screen display, the at least one operation corresponding to one of the at least one displayed polyhedral icon;
 executing an action corresponding to the one of the at least one displayed polyhedral icon based on the identified at least one operation;
 redisplaying an initially displayed face of the at least two faces of the one of the at least one displayed polyhedral icon upon completion of the at least one operation by rotating the one of the at least one displayed polyhedral icon;
 receiving an input of double touches on a selected polyhedral icon of the at least one displayed polyhedral icon, the double touches including a touch to a first vertex of the selected polyhedral icon and a touch to a second vertex of the selected polyhedral icon;
 detecting a dragging of the double touches away from each other to increase a distance between the double touches;
 enlarging a displayed size of the selected polyhedral icon to a size less than an overall size of a display area of the touch screen display in response to the detection when the distance of the dragging is less than a critical distance; and
 enlarging the displayed size of the selected polyhedral icon to a size corresponding to the overall size of the display area of the touch screen display in response to the detection when the distance of the dragging is more than the critical distance.

2. The method of claim 1, wherein the at least one operation comprises receipt of a touch of one of the at least two faces of the one of the at least one displayed polyhedral icon.

3. The method of claim 2, wherein executing the action comprises performing a function assigned to the one of the at least two faces upon which the touch was received.

4. The method of claim 2, wherein the at least one operation further comprises a dragging of the received touch followed by a releasing of the received touch.

5. The method of claim 4, wherein the action comprises rotating the one of the at least one displayed polyhedral icon about a horizontal axis or a vertical axis based on a direction of the dragging.

6. The method of claim 4, wherein the action comprises rotating the one of the at least one displayed polyhedral icon about a horizontal axis or a vertical axis to display the one of the at least two faces upon which the touch was received in a plane parallel to the display.

7. The method of claim 6, further comprising executing a function assigned to a selected face of the at least two faces of the one of the at least one displayed polyhedral icon.

8. The method of claim 5, wherein:
 the rotation of the one of the at least one displayed polyhedral icon is continuous; and
 a selected face and at least one face adjacent to the selected face is visibly displayed.

9. The method of claim 1, further comprising rotating the one of the at least one displayed polyhedral icon to display a face of the at least two faces that is associated with an executable function having a greatest frequency of execution.

10. The method of claim 1, wherein the first vertex and the second vertex are two diagonally opposite vertices of a selected face of the at least two faces of the selected polyhedral icon.

11. The method of claim 10, further comprising reducing a displayed size of the selected polyhedral icon in response to detecting a dragging of the double touches toward each other.

12. The method of claim 1, further comprising increasing a displayed size of a selected one of the at least one displayed polyhedral icon in response to receipt of an input comprising a touching of a selected face of the at least two faces of the selected polyhedral icon for longer than a specified period of time and a removal of the touch to a distance from a surface of the touch screen display,
 wherein the distance is measured by a proximity detector; and wherein the display size of the selected polyhedral icon is increased based on the measured distance.

13. The method of claim 1, further comprising displaying a selected one of the at least one displayed polyhedral icon in a planar view in response to receipt of an input comprising a simultaneous touching of two opposed vertices of one edge of a selected face of the at least two faces of the selected polyhedral icon and a dragging of the two simultaneous touches away from each other.

14. The method of claim 13, further comprising executing the executable function assigned to one of the at least two faces of the polyhedral icon displayed in the planar view in response to receipt of an input comprising a touching of the corresponding face.

15. The method of claim 1, wherein the at least one polyhedral icon is displayed in response to receipt of an input comprising a touching of a boundary of the touch screen display and a dragging of the touch away from the boundary.

16. The method of claim 1, further comprising deleting one polyhedral icon of the displayed at least one polyhedral icon in response to receipt of an input comprising a touching of the one polyhedral icon and a dragging of the one polyhedral icon to a boundary of the touch screen display.

17. The method of claim 1, further comprising editing one polyhedral icon of the displayed at least one polyhedral icon in response to receipt of an input comprising a touching and dragging of the one polyhedral icon to an edit region of the touch screen display.

18. The method of claim 17, wherein editing the one polyhedral icon comprises:
displaying a planar view of the one polyhedral icon to be edited in a first region of the touch screen display; and
displaying a menu of executable functions in a second region of the touch screen display.

19. The method of claim 18, further comprising assigning a selected at least one of the executable functions from the menu of executable functions to at least one of the faces of the polyhedral icon displayed in the first region of the touch screen display in response to receipt of an input comprising a dragging and dropping of the selected at least one executable function to one of the at least two faces of the polyhedral icon displayed in the first region.

20. The method of claim 19, further comprising moving a selected one of the executable functions from one of the at least two faces of the polyhedral icon displayed in the first region to another of the at least two faces of the polyhedral icon in response to receipt of a touch input comprising a dragging and dropping of the selected executable function.

21. The method of claim 19, further comprising deleting a selected one of the executable functions from one of the at least two faces of the polyhedral icon displayed in the first region in response to receipt of an input comprising a dragging and dropping of the selected executable function to a region outside the planar view of the polyhedral icon.

22. The method of claim 1, further comprising:
activating a spring-lock function; and
performing the redisplaying when the spring-lock function is activated.

23. A mobile terminal, comprising:
a touch screen display configured to receive a touch input; and
a controller configured to:
control the touch screen display to display at least one rotatable three-dimensional polyhedral icon, the at least one polyhedral icon having at least two visible faces that are assigned executable functions, wherein one face of the at least two visible faces of each of the displayed at least one polyhedral icon is parallel to the touch screen display;
execute an action corresponding to the one face of one of the displayed at least one polyhedral icon based on at least one operation; and
redisplay the one face of the one of the displayed at least one polyhedral icon upon completion of the at least one operation by rotating the one of the displayed at least one polyhedral icon;
receive an input of double touches on a selected polyhedral icon of the at least one displayed polyhedral icon, the double touches including a touch to a first vertex of the selected polyhedral icon and a touch to a second vertex of the selected polyhedral icon;
detect a dragging of the double touches away from each other to increase a distance between the double touches;
enlarge a displayed size of the selected polyhedral icon to a size less than an overall size of a display area of the touch screen display in response to the detection when the distance of the dragging is less than a critical distance; and
enlarge the displayed size of the selected polyhedral icon to a size corresponding to the overall size of the display area of the touch screen display in response to the detection when the distance of the dragging is more than the critical distance,
wherein the at least one operation comprises receipt of a touch input, via the touch screen display, of the one face of the one of the displayed at least one polyhedral icon.

24. The terminal of claim 23, wherein:
the controller is further configured to control the touch screen display to continuously rotate the one of the displayed at least one polyhedral icon upon receipt of a touch and drag input of one edge of the touched one face; and
the one of the displayed at least one polyhedral icon is rotated about its horizontal axis or its vertical axis based on a direction in which the one edge is dragged.

25. The mobile terminal of claim 23, wherein the controller is further configured to:
add a new executable function to one of the displayed at least one polyhedral icon;
move one of the executable functions between two of the at least two faces of the one of the displayed at least one polyhedral icon; and
delete the function corresponding to one face of the at least two faces of the one of the displayed at least one polyhedral icon.

\* \* \* \* \*